(12) United States Patent
Mizutani

(10) Patent No.: US 8,494,677 B2
(45) Date of Patent: Jul. 23, 2013

(54) MOTION PATH SEARCH DEVICE AND METHOD OF SEARCHING FOR MOTION PATH

(75) Inventor: Kenji Mizutani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/482,060

(22) Filed: May 29, 2012

(65) Prior Publication Data

US 2012/0239193 A1    Sep. 20, 2012

Related U.S. Application Data

(63) Continuation of application No. PCT/JP2011/005437, filed on Sep. 27, 2011.

(30) Foreign Application Priority Data

Nov. 12, 2010    (JP) .................................. 2010-254283

(51) Int. Cl.
  *G05B 19/18* (2006.01)
(52) U.S. Cl.
  USPC ........... 700/250; 700/245; 700/246; 700/255; 700/262; 700/264
(58) Field of Classification Search
  USPC ...... 700/245, 246, 255, 250, 262, 264; 901/8, 901/9
  See application file for complete search history.

(56) References Cited

U.S. PATENT DOCUMENTS

| | | | | |
|---|---|---|---|---|
| 4,003,019 A | * | 1/1977 | Tronel | 340/462 |
| 4,178,632 A | * | 12/1979 | Anthony | 700/251 |
| 4,680,519 A | * | 7/1987 | Chand et al. | 318/568.19 |
| 4,791,588 A | * | 12/1988 | Onda et al. | 700/260 |
| 4,970,370 A | * | 11/1990 | Hara | 219/124.34 |
| 5,675,229 A | * | 10/1997 | Thorne | 318/568.11 |
| 5,748,854 A | * | 5/1998 | Watanabe et al. | 700/258 |

(Continued)

FOREIGN PATENT DOCUMENTS

| JP | 2002-215390 | 8/2002 |
|---|---|---|
| JP | 2010-256252 | 11/2010 |

OTHER PUBLICATIONS

International Search Report issued Dec. 20, 2011 in International (PCT) Application No. PCT/JP2011/005437.

(Continued)

*Primary Examiner* — Khoi Tran
*Assistant Examiner* — Jorge Peche
(74) *Attorney, Agent, or Firm* — Wenderoth, Lind & Ponack, L.L.P.

(57) ABSTRACT

A motion path search device includes a motion space identification unit which identifies, as first spaces, three-dimensional spaces passed through by a movable part in direct teaching operations performed by an operator, and a spatial difference calculation unit that calculates a first differential space that is a part of one of the first spaces identified as a result of one of the direct teaching operations and that has no overlap with another of the first spaces identified as a result of another of the direct teaching operations that precedes the one of the direct teaching operations. A feedback unit provides the operator with information regarding the first differential space, and a path search unit searches for a motion path of the movable part within a first accessible space resulting from combining the first spaces after the direct teaching operations.

11 Claims, 29 Drawing Sheets

U.S. PATENT DOCUMENTS

| | | | | |
|---|---|---|---|---|
| 6,158,822 | A * | 12/2000 | Shirai et al. | 303/3 |
| 6,212,443 | B1 * | 4/2001 | Nagata et al. | 700/245 |
| 6,218,802 | B1 * | 4/2001 | Onoue et al. | 318/568.13 |
| 6,895,305 | B2 * | 5/2005 | Lathan et al. | 700/245 |
| 7,027,031 | B2 * | 4/2006 | Kawasaki et al. | 345/156 |
| 7,298,385 | B2 * | 11/2007 | Kazi et al. | 345/633 |
| 7,714,895 | B2 * | 5/2010 | Pretlove et al. | 348/211.2 |
| 7,814,037 | B2 * | 10/2010 | Ito et al. | 706/23 |
| 8,095,200 | B2 * | 1/2012 | Quaid, III | 600/407 |
| 2002/0120362 | A1 * | 8/2002 | Lathan et al. | 700/245 |
| 2003/0146898 | A1 * | 8/2003 | Kawasaki et al. | 345/156 |
| 2004/0024515 | A1 * | 2/2004 | Troupe et al. | 701/93 |
| 2004/0036437 | A1 * | 2/2004 | Ito | 318/568.12 |
| 2004/0189631 | A1 * | 9/2004 | Kazi et al. | 345/418 |
| 2004/0189675 | A1 * | 9/2004 | Pretlove et al. | 345/633 |
| 2004/0243664 | A1 * | 12/2004 | Horstemeyer | 709/200 |
| 2005/0256611 | A1 * | 11/2005 | Pretlove et al. | 700/264 |
| 2006/0174291 | A1 * | 8/2006 | Takai et al. | 725/88 |
| 2007/0239641 | A1 * | 10/2007 | Ito et al. | 706/23 |
| 2009/0132088 | A1 * | 5/2009 | Taitler | 700/264 |

OTHER PUBLICATIONS

Yusuke Maeda et al., "Teaching of Industrial Manipulators by Manual Volume Sweeping", Division of Systems Research, Faculty of Engineering, Yokohama National University, Transactions of the Japan Society of Mechanical Engineers (Series C), vol. 74, No. 737 (Jan. 2008), article No. 07-0733, Jan. 25, 2008, pp. 115-120, with partial English translation.

Tsutomu Hasegawa et al., "Rapid Acquisition of Free-space and Operator support in a telerobotic system", The 22nd Annual Conference of the Robotics Society of Japan Yokoshu CD-ROM (2004), The Robotics Society of Japan, Sep. 15, 2004.

Tsutomu Hasegawa et al., "Collision-Free Path Planning of a Telerobotic Manipulator based on Swept Volume of Teleoperated Manipulator", Journal of the Robotics Society of Japan, vol. 22, No. 4, May 15, 2004.

* cited by examiner

Voxel having logical value of false

Voxel having logical value of true

701
Voxel having logical value of false

702
Voxel having logical value of true as result of inclusion determination by motion path search device 102

▨ Voxel having logical value of false

☐ Voxel set (R[1]) having logical value of true as result of current teaching operation ▨ Voxel having logical value of false ☐ Voxel set (R_all) having logical value of true as result of preceding teaching operations ▦ Voxel set (R[2] - R_all) having logical value of true as result of current teaching operation ▨ Voxel having logical value of false ☐ Voxel set (R_all) having logical value of true as result of preceding teaching operations ▦ Voxel set (R[3] - R_all) having logical value of true as result of current teaching operation ☒ Voxel having logical value of false
☐ Voxel having logical value of true ▨ Voxel having logical value of false ☐ Voxel having logical value of true as result of inclusion determination by motion path search device 102

▨ Voxel having logical value of false

☐ Voxel having logical value of true as result of inclusion determination by human-occupied space identification unit 1705

Voxel coordinate system and
its origin used by
three-dimensional position sensor

306

306

MOTION PATH SEARCH DEVICE AND METHOD OF SEARCHING FOR MOTION PATH

CROSS REFERENCE TO RELATED APPLICATIONS

This is a continuation application of PCT Patent Application No. PCT/JP2011/005437 filed on Sep. 27, 2011, designating the United States of America, which is based on and claims priority of Japanese Patent Application No. 2010-254283 filed on Nov. 12, 2010. The entire disclosures of the above-identified applications, including the specifications, drawings and claims are incorporated herein by reference in their entirety.

BACKGROUND OF INVENTION

1. Technical Field

Devices and methods consistent with one or more exemplary embodiments of the present disclosure relate generally to a motion path search device which searches for a motion path of a movable part of a robot based on direct teaching, and a method of searching for a motion path.

2. Background Art

A technique has been presented in which a three-dimensional space accessible to a movable part of a robot (hereinafter simply referred to as "accessible space" as appropriate) is automatically identified when an operator teaches the robot a motion by directly moving the robot (herein after referred to as "direct teaching"). In addition, there have been approaches to automatically determine an optimum path for automatic operation based on the automatically identified accessible space. For example, according to non-patent literature (NPL) 1, a space accessible to a robot is automatically obtained in direct teaching and used as a search space to identify an optimum path.

FIG. 32 schematically shows conventional processing for obtaining an accessible space and conventional processing for searching for an optimum path. According to NPL 1, an operator 201 teaches a robot 202 a motion by direct teaching using a force sensor mounted on an end of the robot 202. The robot 202 identifies an accessible space 203 by combining spaces occupied by the robot 202 itself in direct teaching. Then, a motion path 204 between two points is searched for within the identified accessible space 203. In other words, the accessible space 203 is used as a search space. The robot 202 moves along the motion path 204 obtained as a result of the searching so that the robot 202 can automatically works, avoiding the obstacle.

CITATION LIST

Non Patent Literature

[NPL 1] Maeda et al., "Teaching of Industrial Manipulators by Manual Volume Sweeping", Transactions of the Japan Society of Mechanical Engineers (Series C), vol. 74, no. 737 (2008-1)

SUMMARY OF INVENTION

However, as is often the case with the method disclosed in NPL 1, the volume of the accessible space identified using the method is smaller than the volume of a space which the robot can actually access. It is therefore difficult to determine a motion path with higher optimality by using the accessible space as a search space.

One or more exemplary embodiments of the present disclosure may overcome the above disadvantage and other disadvantages not described herein. However, it is understood that one or more exemplary embodiments of the present disclosure are not required to overcome or may not overcome the disadvantage described above and other disadvantages not described herein. One or more exemplary embodiments of the present disclosure provide a motion path search device and a method for searching for a motion path each of which allows efficient expansion of an accessible space through a plurality of direct teaching operations.

A motion path search according to an exemplary embodiment of the present disclosure includes: a first space identification unit configured to identify, as first spaces, three-dimensional spaces swept through by a movable part of a robot in a plurality of direct teaching operations performed by an operator to teach a motion to the robot by directly moving the robot; a second space identification unit configured to identify, as second spaces, three-dimensional spaces swept through by at least a portion of a body of the operator in the direct teaching operations; a spatial difference calculation unit configured to calculate a first differential space and a second differential space, the first differential space being a part of one of the first spaces which is identified as a result of one of the direct teaching operations and having no overlap with an other of the first spaces which is identified as a result of an other of the direct teaching operations that precedes the one of the direct teaching operations, and the second differential space being a part of one of the second spaces which is identified as a result of the one of the direct teaching operations and having no overlap with an other of the second spaces which is identified as a result of the other of the direct teaching operations that precedes the one of the direct teaching operations; a feedback unit configured to provide the operator with at least one of information regarding the first differential space and information regarding the second differential space; a space combining unit configured to combine a first accessible space and a second accessible space, the first accessible space being a combination of the first spaces identified as results of the direct teaching operations, and the second accessible space being a combination of the second spaces identified as results of the direct teaching operations; and a path search unit configured to search for a motion path of the movable part within a space resulting from the combining by the space combining unit, after the direct teaching operations are completed.

It should be noted that these exemplary embodiments can be implemented either generally or specifically as a system, a method, an integrated circuit, a computer program, a recording medium, or any combination of a system, a method, an integrated circuit, a computer program, and a recording medium.

According to various exemplary embodiments of the present disclosure, it is possible to obtain and efficiently expand an accessible space through a plurality of direct teaching operations.

BRIEF DESCRIPTION OF DRAWINGS

These and other advantages and features of the present disclosure will become apparent from the following description thereof taken in conjunction with the accompanying drawings that illustrate general and specific exemplary embodiments of the present disclosure. In the drawings.

Figure 1:
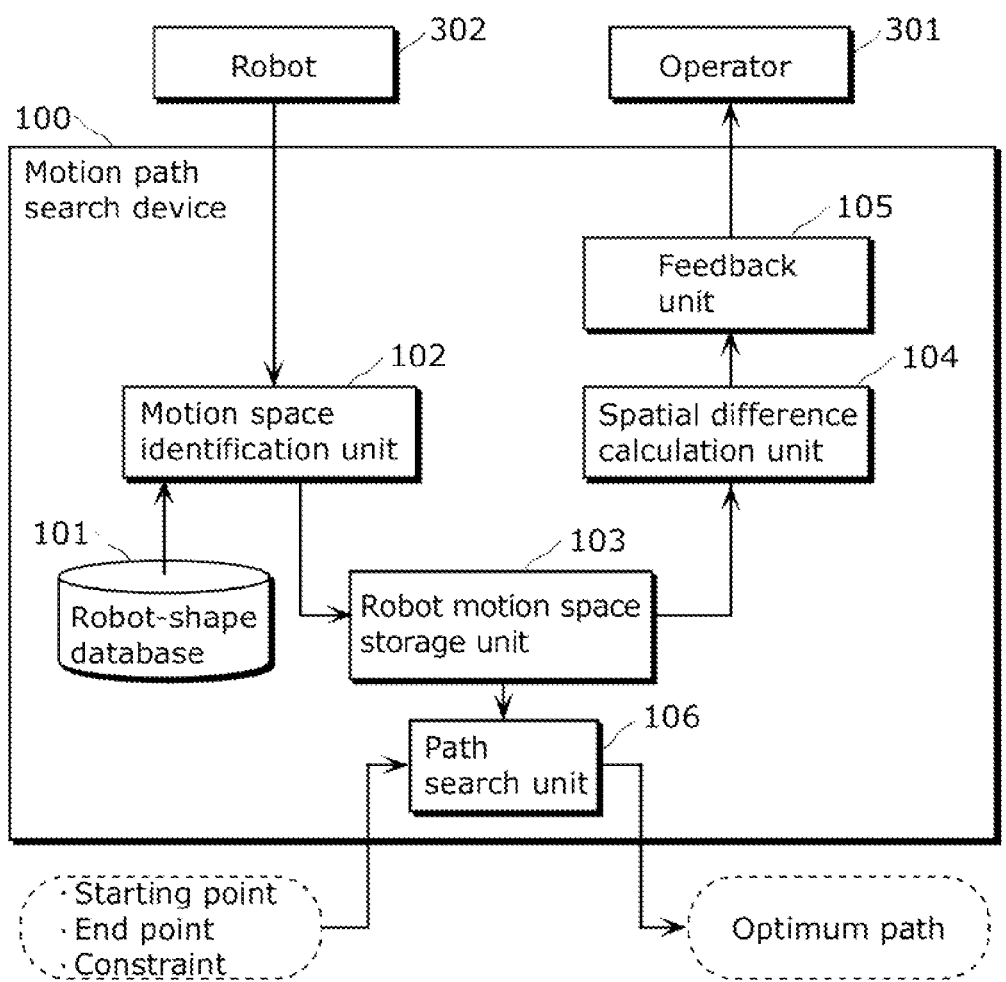
FIG. 1 is a block diagram showing a functional configuration of a motion path search device in Embodiment 1.

DETAILED DESCRIPTION OF INVENTION (Underlying Knowledge Forming Basis of the Present Disclosure)

In the conventional technique, in order to obtain an accessible space of sufficient volume, an operator is further required to teach the robot a motion so that an identified accessible space is expanded. However, it is difficult for the operator to find a motion to teach by which the accessible space can be efficiently expanded. As a result, the operator needs to repeat trial-and-error teaching operations, which leads to increase in cost of teaching.

A motion path search device according to an exemplary embodiment of the present disclosure includes: a first space identification unit configured to identify, as first spaces, three-dimensional spaces swept through by a movable part of a robot in a plurality of direct teaching operations performed by an operator to teach a motion to the robot by directly moving the robot; a spatial difference calculation unit configured to calculate a first differential which is a part of one of the first spaces identified as a result of one of the direct teaching operations and has no overlap with an other of the first spaces identified as a result of an other of the direct teaching operations which precedes the one of the direct teaching operations; a feedback unit configured to provide the operator with information regarding the first differential space; and a path search unit configured to search for a motion path of the movable part within a first accessible space resulting from combining the first spaces identified as results of the direct teaching operations, after the direct teaching operations are completed.

In this configuration, the operator can be provided with information on a first differential space which is a part of one of first spaces that is identified as a result of one of direct teaching operations. The part has no overlap with an other of the first spaces which is identified as a result of an other of the direct teaching operations that precedes the one of the direct teaching operations. Thus, the operator can perform the next direct teaching operation with reference to the provided information. As a result, an accessible space can be obtained and efficiently expanded through the direct teaching operations.

For example, the feedback unit may be configured to provide, as the information regarding the first differential space, a volume ratio of the first differential space to the first space identified as the result of the other of the direct teaching operations that precedes the one of the direct teaching operations In this configuration, the operator can be notified of a volume ratio of a first differential space identified as a result of one of direct teaching operations to a first space identified as a result of an other of the direct teaching operations which precedes the one of the direct teaching operations. In other words, the operator can be notified of the ratio of increase in the accessible space as a result of the one of the direct teaching operations. Thus, the operator can learn the degree of contribution of the one of the direct teaching operations to expansion of the accessible space. As a result, the accessible space can be efficiently expanded through the direct teaching operations.

For example, the first space identification unit may be configured to identify, as the first spaces, spaces each composed of a set of voxels included in the robot at points of time in a corresponding one of the direct teaching operations, the voxels being among voxels composing three-dimensional space, and the feedback unit is configured to provide, as the volume ratio, a ratio of the number of voxels composing the first differential space to the number of voxels composing the first space identified as the result of the other of the direct teaching operations that precedes the one of the direct teaching operations.

In this configuration, the operator can be notified of a volume ratio obtained using the numbers of voxels used for identification of the first spaces, so that processing load for obtaining a volume ratio can be reduced.

For example, the motion path search device may further include: a second space identification unit configured to identify, as second spaces, three-dimensional spaces swept through by at least a portion of a body of the operator in the direct teaching operations; and a space combining unit configured to combine a first accessible space and a second accessible space, the first accessible space being a combination of the first spaces identified as results of the direct teaching operations, and the second accessible space being a combination of the second spaces identified as results of the direct teaching operations, wherein the spatial difference calculation unit may be further configured to calculate a second differential space which is a part of one of the second spaces identified as a result of the one of the direct teaching operations and has no overlap with an other of the second spaces identified as a result of the other of the direct teaching operations which precedes the one of the direct teaching operations, the feedback, unit may be further configured to provide the operator with information regarding the second differential space, and the path search unit may be configured to search for a motion path of the movable part within a space resulting from combining by the space combining unit instead of the first accessible space.

In this configuration, an accessible space can be obtained using the first space and the second space swept through by the robot and at least a portion of the body of the operator in direct teaching, respectively. In other words, a space not swept through by the robot in the direct teaching can also be included in an accessible space. Since the obtained accessible space additionally contains a space expanded from the space swept through by the robot, it is possible to determine a motion path with higher optimality. Furthermore, the operator can be provided with the information on the second differential space in addition to the information on the first differential space. The second differential space is a part of one of the second spaces which is identified as a result of one of the direct teaching operations. The part has no overlap with an other of the second spaces which is identified as a result of an other of the direct teaching operations that precedes the one of the direct teaching operations. This allows the operator to determine, for example, which of the paths, that is, the path of the movable part of the robot and the path of the body of the operator, should be deliberately changed in order to efficiently expand the accessible space in the next direct teaching operation. As a result, the accessible space can be efficiently expanded through the direct teaching operations.

For example, the feedback unit may be configured to provide, as the information regarding the second differential space, a volume ratio of the second differential space to the second space identified as the result of the other of the direct teaching operations that precedes the one of the direct teaching operations.

In this configuration, the operator can be notified of the volume ratio of the second differential space identified as a result of one of direct teaching operations to the second space identified as a result of an other of the direct teaching operations which precedes the one of the direct teaching operations. In other words, the operator can be notified of the ratio of increase in the accessible space as a result of the one of the direct teachings. Thus, the operator can learn the degree of contribution of the one of the direct teaching operations to expansion of the accessible space. As a result, the accessible space can be efficiently expanded through the direct teaching operations.

For example, the second space identification unit may be configured to identify, as the second spaces, spaces each composed of a set of voxels included in the at least a portion of the body of the operator at points of time in a corresponding one of the direct teaching operations, the voxels being among voxels composing three-dimensional space, and the feedback unit may be configured to provide, as the volume ratio, a ratio of the number of voxels composing the second differential space to the number of voxels composing the second space identified as the result of the other direct teaching operations that precedes the one direct teaching operations.

In this configuration, the operator can be notified of a volume ratio obtained using the number of voxels used for identification of the second space, so that processing load for obtaining a volume ratio can be reduced.

For example, the feedback unit may be configured to provide one of the information regarding the first differential space and the information regarding the second differential space, depending on a result of comparison between the first differential space and the second differential space. Specifically, the feedback unit may be configured to provide the information regarding the first differential space when the first differential space is smaller than the second differential space, and with the information regarding the second differential space when the second differential space is smaller than the first differential space.

In this configuration, the operator can be provided with information regarding one of the space swept through by the robot and the space swept through by the operator which contributes to the expansion of the accessible space less than the other. As a result, the accessible space can be efficiently expanded through a plurality of direct teaching operations.

For example, the motion path search device may further include a posture difference calculation unit configured to calculate a difference between one or more values indicating a posture of the operator at a start of an other of the direct teaching operations which immediately precedes the one of the direct teaching operations and one or more values indicating a posture of the operator at a start of the one of the direct teaching operations, wherein the feedback unit may be further configured to provide the operator with information regarding the posture, based on the calculated difference, at the start of the one of the direct teaching operations. Specifically, for example, the robot may have a handle part which the operator grasps to perform the direct teaching operations, and the postures of the operator may be directions of an elbow of the operator as seen from the handle part.

In this configuration, at the start of one of direct teaching operations, the operator can be notified of difference between a posture taken when an other of direct teaching operations which immediately precedes the one of the direct teaching operations and a posture to be taken for the one of the direct teaching operations from now. The operator can thus change his or her posture for the one of the direct teaching operations from the posture taken in the other of the direct teaching operations which immediately precedes the one of the direct teaching operations. As a result, the accessible space can be efficiently expanded through the plurality of direct teaching operations.

For example, the values indicating the postures may include first values and second values, the first values each indicating an angle of a corresponding one of the direction of the elbow with respect to a plane perpendicular to an axis of the handle part, and the second values each indicating an angle between the corresponding one of the directions of the elbow and the plane, the posture difference calculation unit may be configured to calculate a difference between the first values and a difference between the second values, and the feedback unit may be configured to provide the information regarding the posture, based on a result of comparison between the difference between the first values and the difference between the second values.

In this configuration, the operator can be provided with more detailed information based on the differences from a preceding direct teaching operation in two angles indicating the direction of an elbow of the operator as seen from the handle part.

For example, the feedback unit may be configured to provide the information regarding the posture at the start of the one of the direct teaching operations when the second differential space is smaller than the first differential space as a result of the other of the direct teaching operations which immediately precedes the one of the direct teaching operations.

In this configuration, it is possible to provide information regarding the operator's posture when the contribution of the second space swept through by the operator to the expansion of the accessible space is smaller than the contribution of the first space swept through by the robot. In other words, since the operator is provided with information regarding his or her posture when change of the posture is highly necessary, the accessible space can be efficiently expanded.

Furthermore, these exemplary embodiments of the present disclosure can be implemented either generally or specifically as a system, a method, an integrated circuit, a computer program, a recording medium, or any combination of a system, a method, an integrated circuit, a computer program, and a recording medium.

Hereinafter, certain exemplary embodiments of the present disclosure are described in detail with reference to the accompanying drawings.

Each of the exemplary embodiments described below shows a general or specific example. Specifically, the numerical values, shapes, materials, structural elements, the arrangement and connection of the structural elements, steps, the processing order of the steps etc. shown in the following exemplary embodiments are mere examples, and therefore do not limit the inventive concept of the present disclosure, the scope of which is defined in the appended Claims and their equivalents. Therefore, among the constituent elements in the following exemplary embodiments, constituent elements not recited in any one of the independent claims defining the most generic part of the inventive concept are not necessarily required in order to overcome the disadvantages.

It should be noted that in the following embodiments one of direct teaching operations is referred to as a current direct teaching operation. It should also be noted that direct teaching operations performed before the one of the direct teaching operations is referred to as preceding direct teaching operations. It should also be noted that the direct teaching operation immediately preceding the one of the direct teaching operations is referred to as the last direct teaching operation.

Embodiment 1

FIG. 1 is a block diagram showing a basic functional configuration of a motion path search device 100 in Embodiment 1. As shown in FIG. 1, the motion path search device 100 includes a robot-shape database 101, a motion space identification unit 102, a robot motion space storage unit 103, a spatial difference calculation unit 104, a feedback unit 105, and a path search unit 106.

The robot-shape database 101 stores robot-shape data indicating the shape of a robot 302 which performs automated operation.

The motion space identification unit 102 corresponds to a first space identification unit. The motion space identification unit 102 identifies, as a first space (hereinafter referred to as a "robot motion space"), a three-dimensional space swept through by a movable part in each direct teaching operation.

Specifically, the motion space identification unit 102 identifies a three-dimensional space occupied by the robot 302 at points of time in direct teaching, based on posture information of the robot 302 and the robot-shape data stored in the robot-shape database 101. Then, the motion space identification unit 102 identifies a robot motion space by combining three-dimensional spaces occupied by the robot 302 at points of time in the direct teaching.

The robot motion space storage unit 103 handles the robot motion space identified by the motion space identification unit 102. Specifically, for example, the robot motion space storage unit 103 includes a memory or the like and stores spatial data indicating the identified robot motion space in the memory or the like. Optionally, the robot motion space storage unit 103 may store spatial data indicating a robot motion space in another storage area such as an external storage unit.

The spatial difference calculation unit 104 calculates a first differential space. Here, the first differential space is a part of the robot motion space identified as a result of the current direct teaching operation, and has no overlap with any of the robot motion spaces identified as results of preceding direct teaching operations. In other words, the first differential space is a space newly added to a first accessible space.

The feedback unit 105 provides an operator 301 with feedback information regarding the first differential space calculated by the spatial difference calculation unit 104. In Embodiment 1, the feedback unit 105 provides, as the feedback information regarding the first differential space, a volume ratio of the first differential space to the first spaces identified as results of the preceding direct teaching operations.

The path search unit 106 searches for a motion path of the movable part of the robot 302 within a first accessible space after a plurality of direct teaching operations are performed. The first accessible space is a combination of robot motion spaces identified as results of direct teaching operations. In other words, the first accessible space is a union of robot motion spaces. To put it another way, the first accessible space is composed of robot motion spaces with an overlap therebetween.

Specifically, the path search unit 106 searches for an optimum motion path among candidate motion paths within the first accessible space based on a given search condition. In other words, the path search unit 106 searches for an optimum motion path which satisfies the search condition, using the first accessible space as a search space. The search condition is, for example, the positions of a starting point and an end point, a criterion of optimality (such as precedence of time or precedence of power saving), or a constraint. In Embodiment 1, a motion path can be determined using a conventional method. The method is not limited as long as it can be used for determining a motion path within a search space.

Next, a scene in which the motion path search device 100 is used shall be described.

Figure 2:
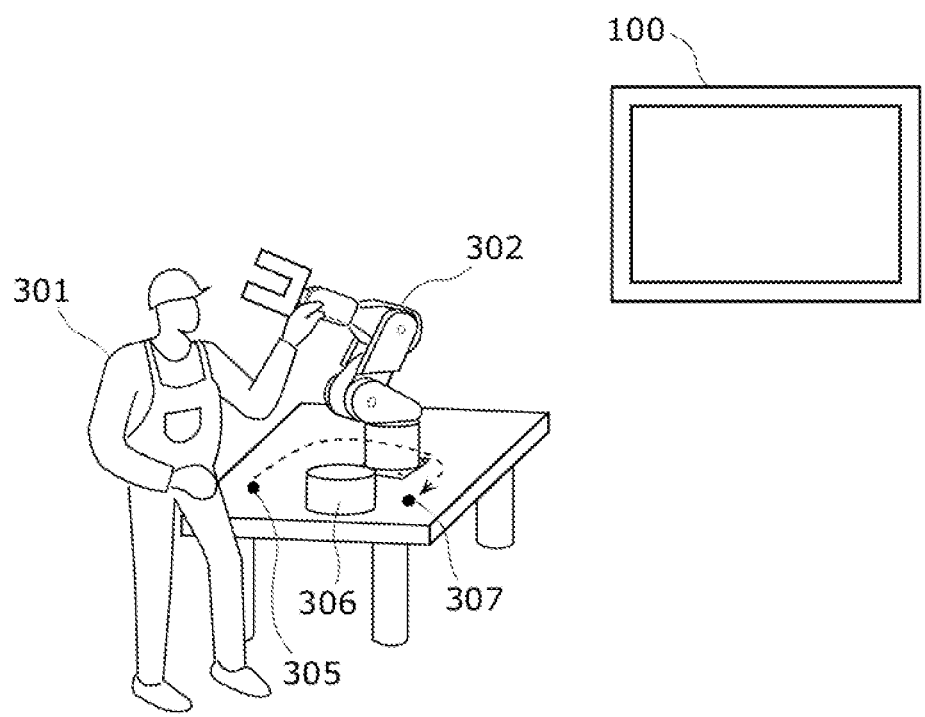
FIG. 2 shows a scene in which the motion path search device is used in Embodiment 1.

FIG. 2 shows a scene in which the motion path search device 100 is used in Embodiment 1. The operator 301 teaches the robot 302 continuous postures to take by applying force to a part of the robot 302. The part of the robot 302 senses external force. In FIG. 2, the operator 301 is teaching a motion to the robot 302 by directly moving the movable part of the robot 302 from a starting point 305 to an end point 307, avoiding bringing the movable part into contact with an obstacle 306.

Figure 3:
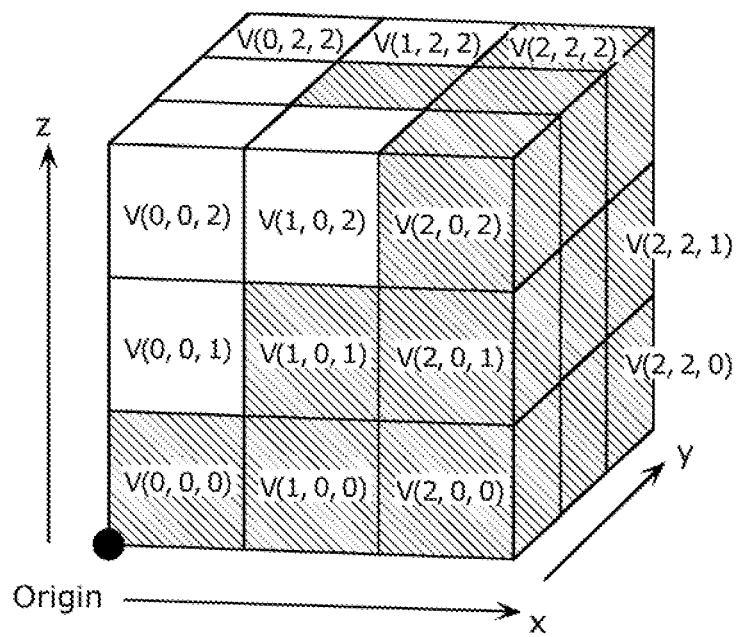
FIG. 3 is a diagram for illustrating voxels indicating a volume in an accessible space in Embodiment 1.
Figure 3:
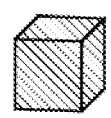
Figure 3:
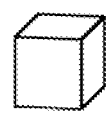

Next, three-dimensional space in which a three-dimensional model of the robot 302 is virtually placed shall be described. A closed region in three-dimensional space is indicated by voxels. A voxel is a cube of a certain size and is a basic unit of the volume of a three-dimensional space as shown in FIG. 3. The voxel located at a three-dimensional position (x, y, z) from the origin is indicated as V(x, y, z). The voxel V(x, y, z) has a logical value M(x, y, z), which indicates whether or not the voxel V(x, y, z) is accessible to the robot 302. When it is unknown whether or not there is an obstacle which blocks a motion of the robot 302 is within V(x, y, z), its logical value M(x, y, z) is represented by Expression (1) below.

$$M(x,y,z)=\text{false} \qquad \text{Expression (1)}$$

When there is no obstacle which blocks a motion of the robot 302 within V(x, y, z) and the robot 302 can enter V(x, y, z), its logical value M(x, y, z) is represented by Expression (2) below.

$$M(x,y,z)=\text{true} \qquad \text{Expression (2)}$$

In the example shown in FIG. 3, the voxels with hatched lines have a logical value of false, whereas the unpatterned voxels with no hatched lines have a logical value of true. In other words, in order to avoid an obstacle, the robot 302 needs to avoid entering the voxels with hatched lines and move through the voxels with no hatched lines. The accessible space is indicated as a set of voxels having a logical value of true using Expression (3) below.

$$\cup\{V(x,y,z)|M(x,y,z)=\text{true}\} \qquad \text{Expression (3)}$$

As such, whether or not the robot 302 comes into contact with an obstacle, the three-dimensional space accessible to the robot 302 can be indicated by voxels. Before teaching, the logical values of all the voxels are set to false. In other words, accessibility of the entire working envelope of the robot 302 is unknown before teaching.

Next, the robot 302 in Embodiment 1 shall be described below.

Figure 4:
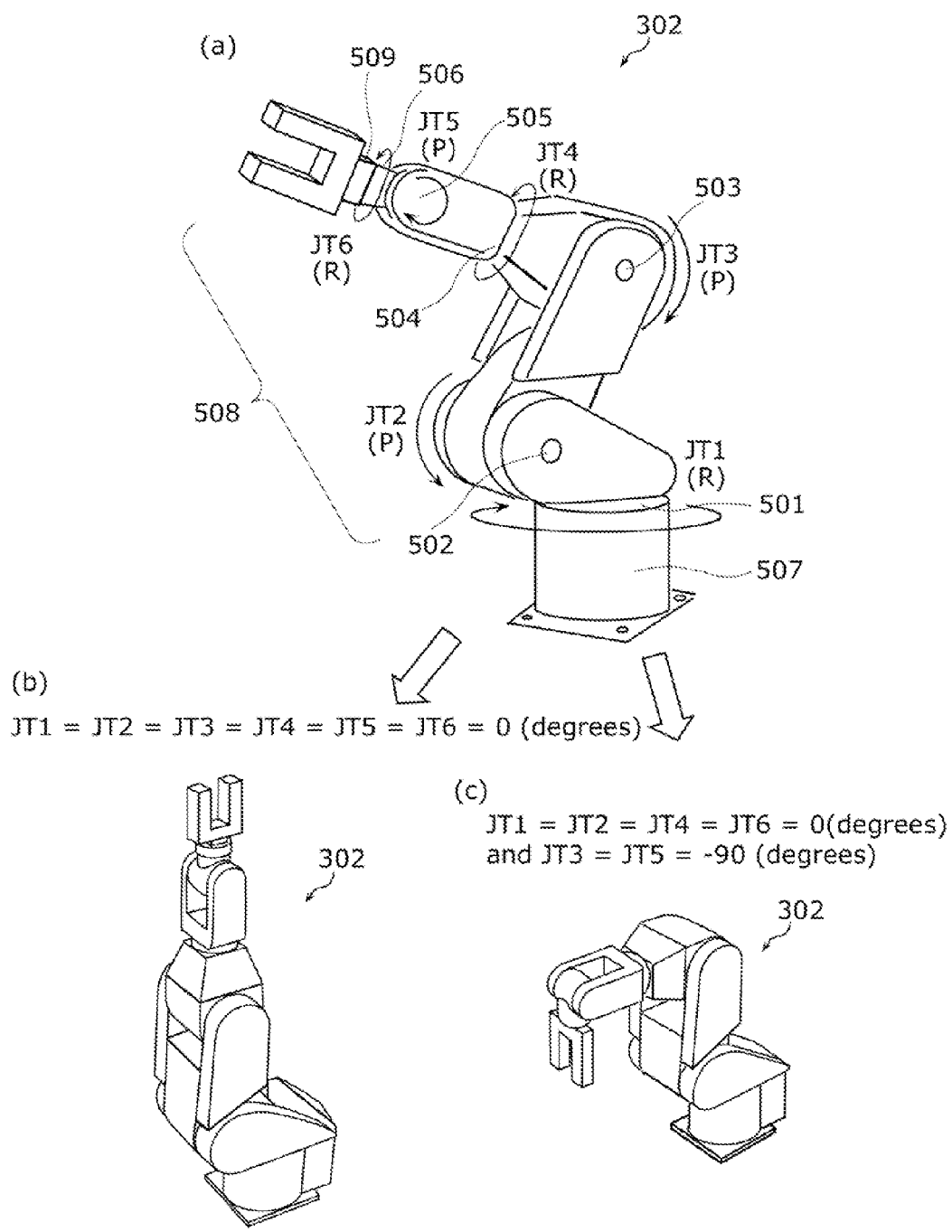
FIG. 4 illustrates an external view of a robot in Embodiment 1.

FIG. 4 illustrates an external view of the robot 302 in Embodiment 1. The robot 302 is, for example, a 6-axis vertical articulated robot. As shown in (a) in FIG. 4, the configuration of the robot 302 in Embodiment 1 is R-P-P-R-P-R (R for rotational and P for parallel).

A combination of the angles of six rotational axes 501 to 506 are indicated as (JT1, JT2, JT3, JT4, JT5, JT6). The posture of the robot 302 is uniquely determined by a combination of the angles of the six rotational axes 501 to 506.

The robot-shape database 101 stores robot-shape data representing the shape of the robot shown in FIG. 4 as a closed region using segments of straight or curved lines. Accordingly, with a combination (JT1, JT2 JT3, JT4, JT5, JT6), the motion space identification unit 102 can calculate a unique three-dimensional position of the movable part 508 relative to a stationary part 507 based on the robot-shape data.

For example, in the case where the robot 302 is calibrated so as to take an upright posture as shown in (b) in FIG. 4 when JT1=JT2=JT3=JT4=JT5=JT6=0 (degrees), the robot 302 takes a posture as shown in (c) in FIG. 4 when JT1=JT2=JT4=JT6=0 (degrees) and JT3=JT5=−90 (degrees).

In direct teaching, the operator 301 can change the posture of the robot 302 by applying power to a force sensor installed inside the robot 302, grasping the handle part 509 of the robot 302.

The robot 302 need not have a configuration as described above. In other words, the robot 302 may be a vertical articulated robot having a configuration other than R-P-P-R-P-R. The robot 302 may be a horizontal articulated robot. The robot 302 may be a combination of single-axis robots.

Next, operations of the motion path search device 100 having the above-described configuration shall be described below.

Figure 5:
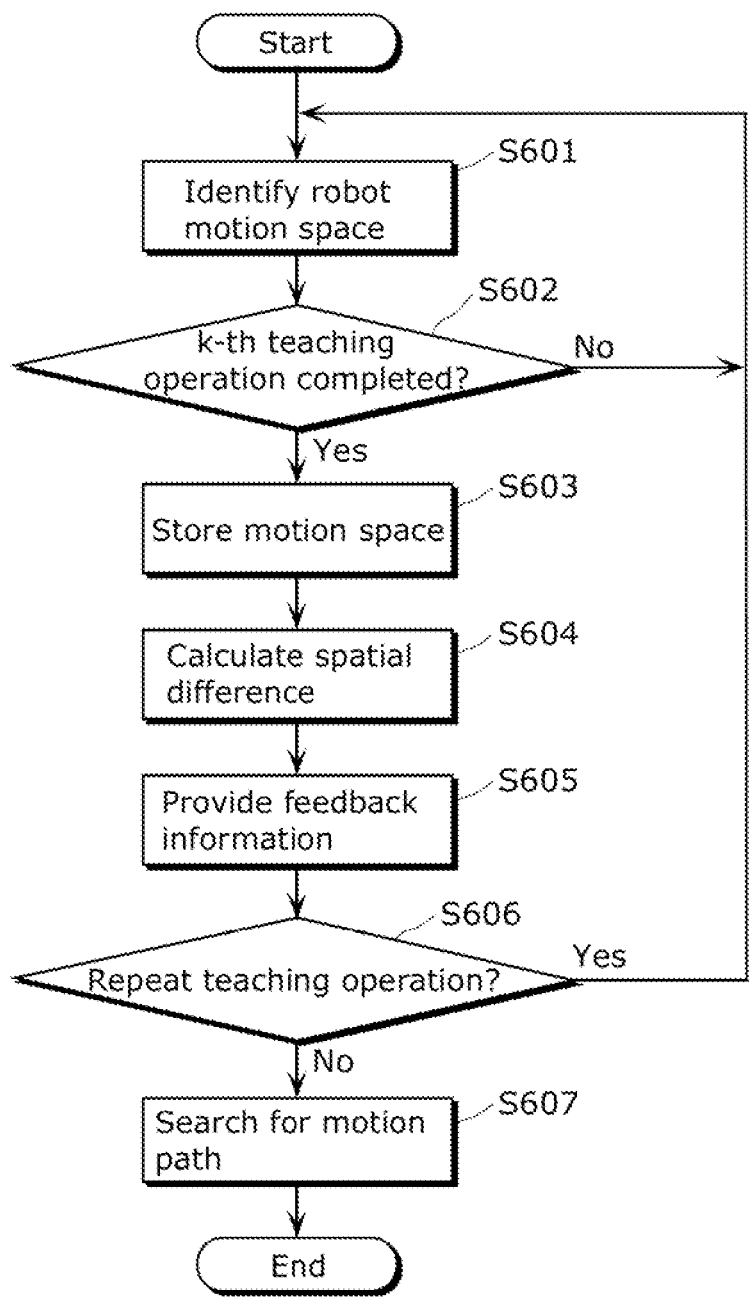
FIG. 5 is a flowchart showing a process of searching for a motion path in Embodiment 1.

FIG. 5 is a flowchart showing the process of searching for a motion path according to Embodiment 1. In the direct teaching described below, the operator 301 teaches the robot 302 a motion from the starting point 305 to the end point 307, moving around the obstacle 306.

The operator 301 performs direct teaching while grasping the handle part 509 of the robot 302, so that the values (JT1, JT2, JT3, JT4, JT5, JT6) indicating the angles of the rotational axes change whereby the robot 302 changes its posture.

At this time, the motion space identification unit 102 identifies a space occupied by the movable part 508 of the robot 302 (S601). Specifically, first the motion space identification unit 102 obtains the values indicating the angles of the rotational axes of the robot 302 as posture information from the robot 302 at regular intervals T. Next, the motion space identification unit 102 obtains robot-shape data stored in the robot-shape database 101. Then, the motion space identification unit 102 performs inclusion determination as to whether or not each of the voxels composing three-dimensional space is located inside the robot 302, based on the obtained posture information and robot-shape data.

The inclusion determination is a process of determining whether or not all points in a voxel is within a closed region indicated by robot-shape data (this is hereinafter described as "a voxel is included in the robot 302") using a method such as a known "point-in-polygon test".

The motion space identification unit 102 determines a voxel included in the robot 302 as being a voxel accessible to the movable part 508, and therefore sets the logical value of the voxel to true. On the other hand, the motion space identification unit 102 does not change the logical value of a voxel not included in the robot 302. The motion space identification unit 102 identifies a three-dimensional space composed of a set of voxels having a logical value of true as a result of the inclusion determination as a space occupied by the movable part 508 of the robot 302.

The process in Step S601 shall be described below in more detail using FIG. 6.

Figure 6:
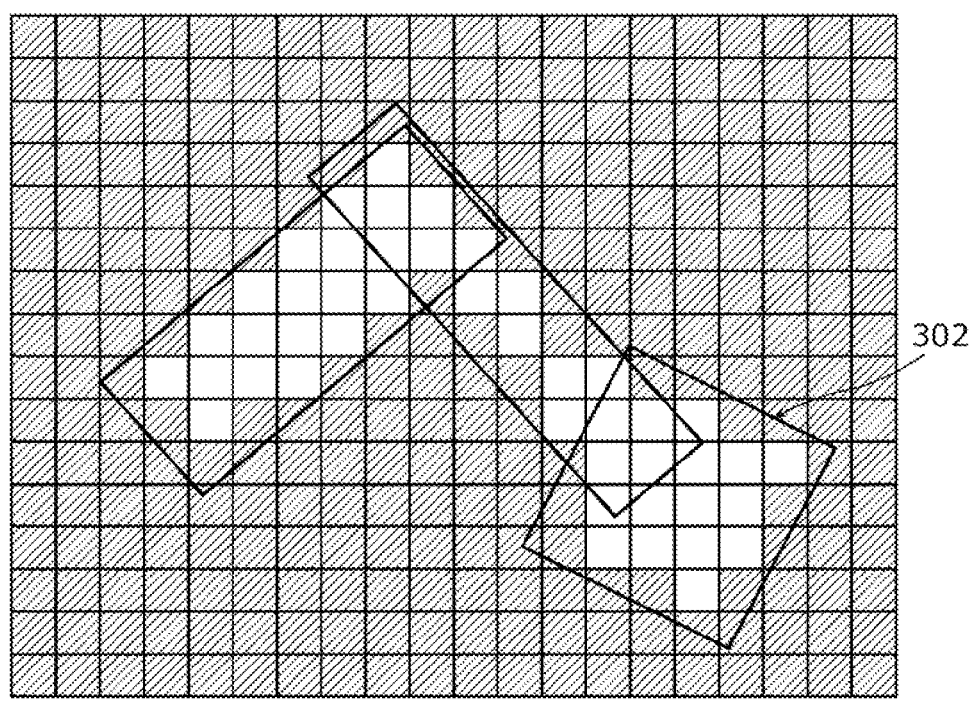
FIG. 6 is a diagram for illustrating inclusion determination by a motion space identification unit in Embodiment 1.
Figure 6:
Figure 6:

FIG. 6 is a diagram for illustrating the inclusion determination by the motion space identification unit 102 in Embodiment 1.

FIG. 6 shows positional relationships between the voxels and a part of the robot 302 using a projection thereof on a two-dimensional plane for simplicity. As shown in FIG. 6, the logical values of voxels 702 included in the robot 302 are set to true. In other words, the logical values of voxels 701 having any part outside the robot 302 are not changed.

The set R of the voxels determined as being included in the robot 302 by the motion space identification unit 102 is represented by Expression (4).

$$R = \cup \{V(x,y,z) | M(x,y,z) = \text{true}\} \quad \text{Expression (4)}$$

The set R of voxels corresponds to a space occupied by the robot 302 at a point of time in direct teaching.

The process in Step S601 is repeated until the operator 301 indicates completion of the k-th direct teaching operation (k is an integer greater than or equal to one). In other words, the motion space identification unit 102 repeats inclusion determination at regular intervals T until an indication of completion of the k-th direct teaching operation is received from the operator 301 (S602).

After the k-th direct teaching operation is completed, the set R of voxels is composed of voxels determined as being included in the robot 302 at not less than one of the points of time in the k-th direct teaching operation. The set R of voxels thus obtained corresponds to a robot motion space swept through by the movable part 508 of the robot 302 in the k-th direct teaching operation.

Next, after the k-th direct teaching operation is completed, the robot motion space storage unit 103 stores, in a memory or the like, spatial data indicating the robot motion space identified as a result of the k-th direct teaching operation (S603).

Next, the spatial difference calculation unit 104 calculates, as a first differential space, a part of the robot motion space identified as a result of the current (k-th) direct teaching operation. The part is a space having no overlap with the robot motion spaces identified as results of the preceding (the first to (k−1)-th) direct teaching operations (S604). Specifically, the spatial difference calculation unit 104 calculates the first differential space using, for example, the spatial data stored in the memory or the like.

Next, the feedback unit 105 provides the operator 301 with information regarding the first differential space (S605). Specifically, the feedback unit 105 provides, as the information regarding the first differential space, the volume ratio of the first differential space to the robot motion spaces identified as results of the preceding direct teaching operations.

Here, when an indication of repetition of direct teaching operations is received from by the operator 301 (Yes in S606), the process returns to Step S601 and the (k+1)-th direct teaching operation is performed. When an indication of repetition of direct teaching operations is not received from the operator 301 (No in S606), the path search unit 106 searches for a motion path of the movable part 508 of the robot 302 within the first accessible space obtained by combining robot motion spaces identified as results of the first to k-th direct teaching operations (S607).

In this manner, the motion path search device 100 searches for a motion path of the movable part 508 of the robot 302 based on the plurality of direct teaching operations.

The process from Steps S603 to S605 in FIG. 5 shall be described below in more detail using FIG. 7 to FIG. 14. The following describes a process after the first direct teaching operation is completed using FIG. 7 to FIG. 8. Before the first direct teaching, the set R_all of voxels is initialized to be Ø (an empty set).

Figure 7:
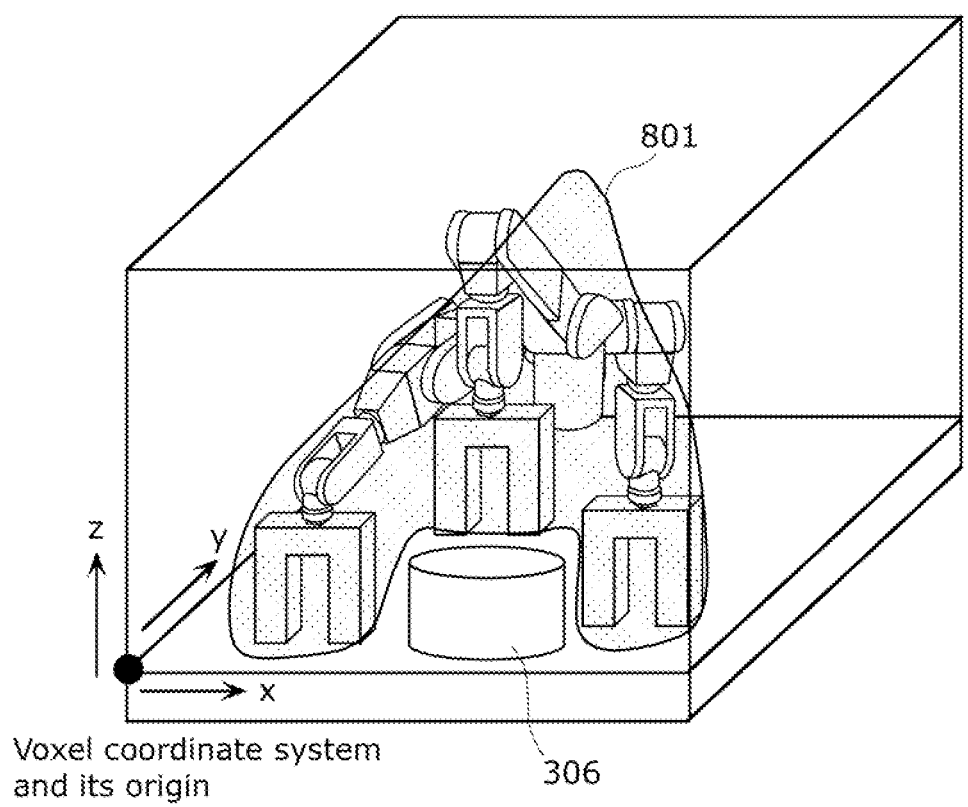
FIG. 7 is a diagram showing an example of a robot motion space identified as a result of the first direct teaching operation in Embodiment 1.
Figure 8:
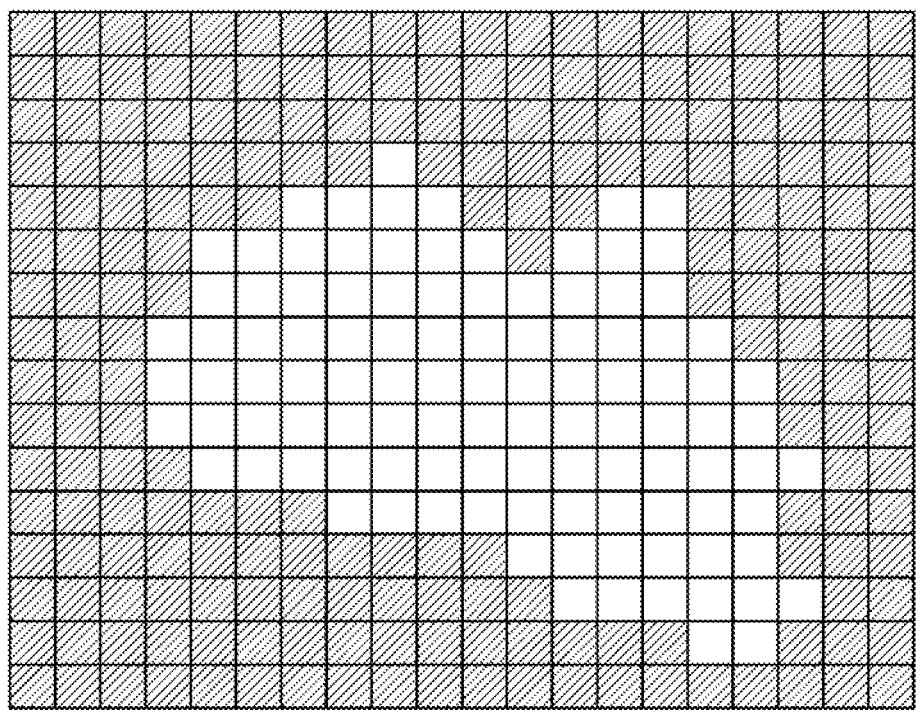
FIG. 8 is a diagram showing a set of voxels composing the robot motion space identified as a result of the first direct teaching operation in Embodiment 1.

FIG. 7 is a diagram showing an example of a robot motion space 801 identified as a result of the first direct teaching in Embodiment 1. FIG. 8 is a diagram showing a set R[1] of voxels composing the robot motion space 801 identified as a result of the first direct teaching operation in Embodiment 1.

First, the robot motion space storage unit 103 stores spatial data indicating the set R[1] of the voxels obtained as a result of the first direct teaching operation in a memory or the like.

Next, the spatial difference calculation unit 104 calculates a difference DR between the set R[1] of the voxels obtained as a result of the first direct teaching operation as shown in FIG. 8 and R_all (an empty set at this stage). The calculation is represented by Expression (5) below.

$$DR = |R[1] - R\_\text{all}| = 106 \quad \text{Expression (5)}$$

Here, A−B is the abridged notation of A ∩ (the complement of B), and |A| indicates the number of elements of A. R_all is the set of voxels composing the space which is the combination of the robot motion spaces identified as results of the preceding direct teaching operations. In other words, R_all corresponds to the first accessible space obtained as a result of the preceding direct teaching operations.

The spatial difference calculation unit 104 thus calculates, as the first differential space, a part of the robot motion space identified as a result of the current direct teaching operation. The part is a space having no overlap with any of the robot motion spaces identified as results of the preceding direct teaching operations. Then, the spatial difference calculation unit 104 calculates, as the difference DR, the number of the voxels composing the calculated first differential space.

It should be noted that R_all is an empty set here because the direct teaching operation is the first one. Accordingly, the spatial difference calculation unit 104 need not calculate the difference DR. When no difference DR is calculated, the feedback unit 105 does not provide the operator 301 with feedback information.

The following describes a process after the second direct teaching operation is completed using FIG. 9 to FIG. 12.

Figure 9:
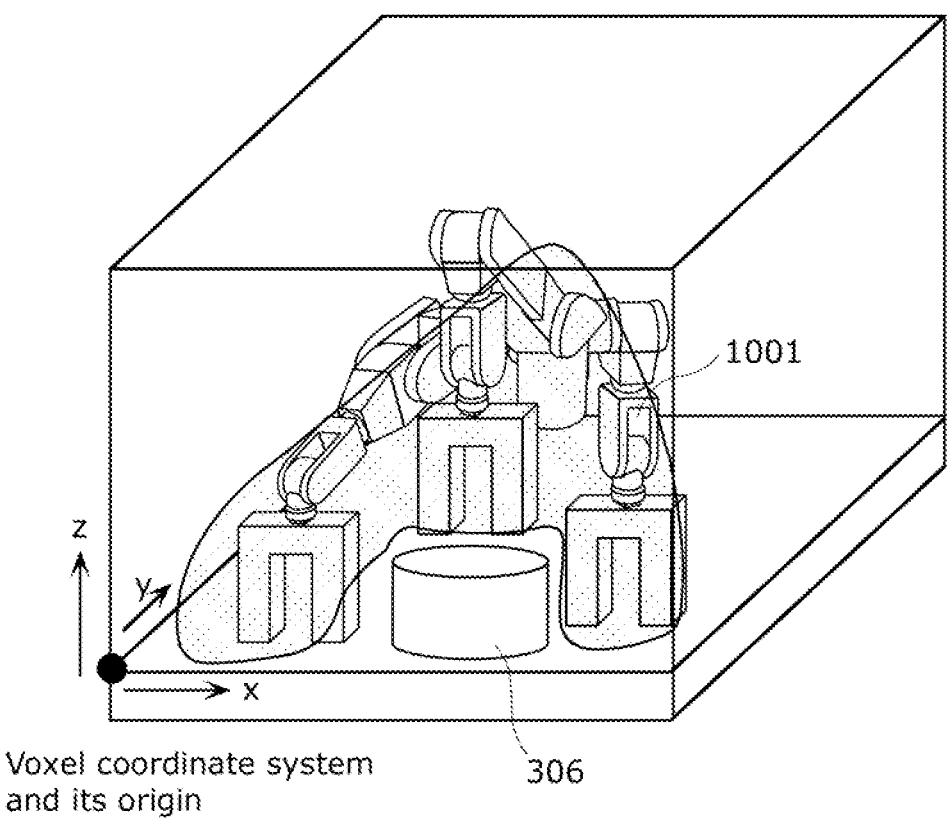
FIG. 9 is a diagram showing an example of a robot motion space identified as a result of the second direct teaching operation in Embodiment 1.
Figure 10:
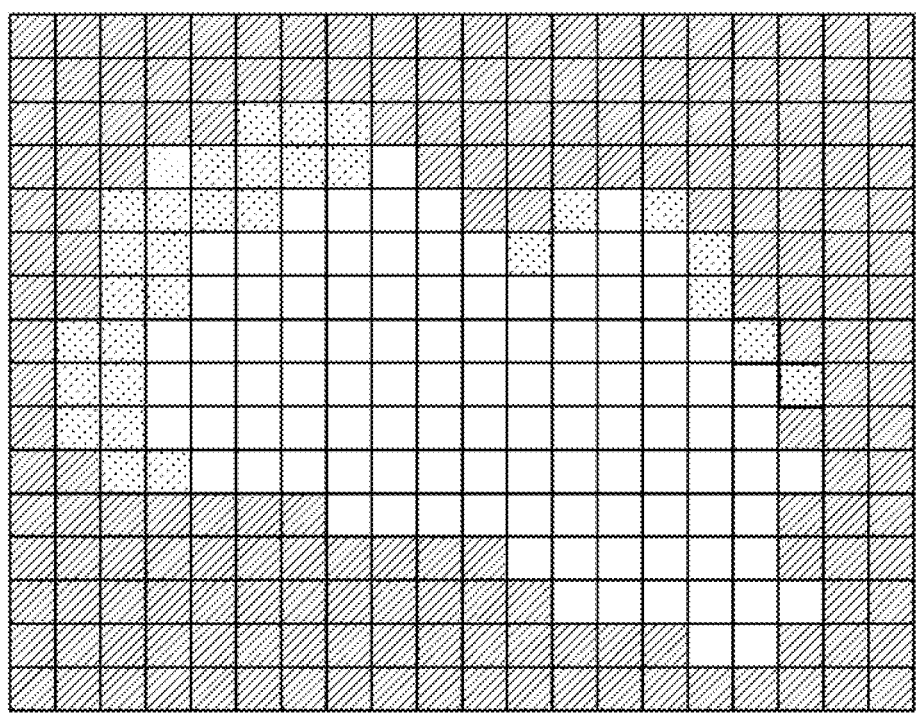
FIG. 10 is a diagram showing a set of voxels composing the robot motion space identified as results of the first and second direct teaching operations in Embodiment 1.

FIG. 9 is a diagram showing an example of a robot motion space 1001 identified as a result of the second direct teaching operation in Embodiment 1. FIG. 10 is a diagram showing a set of voxels composing the robot motion spaces identified as results of the first direct teaching to the second direct teaching in Embodiment 1.

Before the following process is performed, the robot motion space storage unit 103 updates the set R_all of voxels with the set R[1] of the voxels obtained as a result of the first direct teaching operation. The updating is indicated as follows.

$$R\_\text{all} \leftarrow R\_\text{all} \cup R[1]$$

First, the robot motion space storage unit 103 stores spatial data indicating the set R[2] of the voxels obtained as a result of the second direct teaching operation in a memory or the like.

Next, the spatial difference calculation unit 104 calculates a difference DR between the set R[2] of the voxels obtained as a result of the second direct teaching operation and the set R_all of the voxels obtained as a result of the preceding direct teaching operation. Specifically, the spatial difference calculation unit 104 calculates, as the first differential space, a part of the robot motion space identified as a result of the second direct teaching operation. The part is a space having no overlap with the robot motion space identified as a result of the first direct teaching operation. Then, the spatial difference calculation unit 104 calculates, as the difference DR, the number of the voxels composing the calculated first differential space.

The following process is described using FIG. 10 which shows a projection of voxels in three-dimensional space onto a two-dimensional plane for simplicity of description in the same manner as in FIG. 6. In FIG. 10, the values of the difference DR and |R_all| are calculated as follows.

$$DR=|R[2]-R\_all|=31$$

$$|R\_all|=106$$

The spatial difference calculation unit 104 provides the feedback unit 105 with the calculated difference DR and |R_all| as differential information.

The feedback unit 105 notifies the operator 301 that the increase ratio of R_all is 29.2% (=31/106). In other words, the feedback unit 105 notifies the operator 301 of the ratio of the number of the voxels composing the first differential space to the number of voxels composing the robot motion space identified as a result of the first direct teaching operation. Thus, the operator 301 can learn the degree of contribution of the current direct teaching operation to expansion of the accessible space.

In Embodiment 1, since the volume of each voxel is the same, the ratio of the numbers of the voxels is equivalent to the volume ratio. This means that the feedback unit 105 can notify the operator of a volume ratio obtained using the number of voxels, and processing load for obtaining a volume ratio can be reduced.

Figure 11:
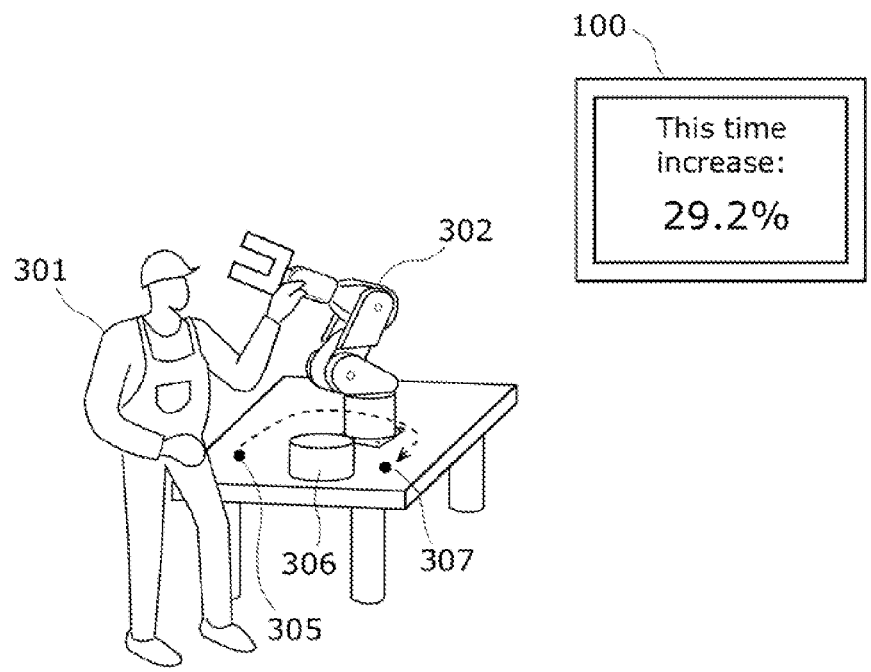
FIG. 11 shows an example of presentation of feedback information in Embodiment 1.
Figure 12:
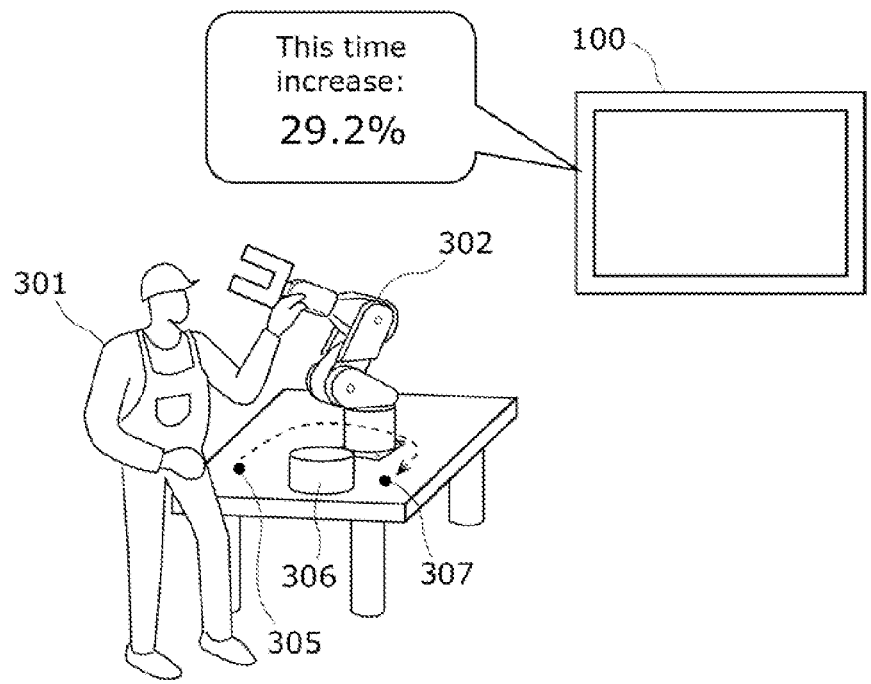
FIG. 12 is another example of presentation of feedback information in Embodiment 1.

The feedback unit 105 can use a notification method in which the calculated ratio is shown on a display as shown in FIG. 11, for example. Optionally, for example, the feedback unit 105 may use a notification method in which the calculated ratio is read out using a synthesized voice as shown in FIG. 12.

Figure 13:
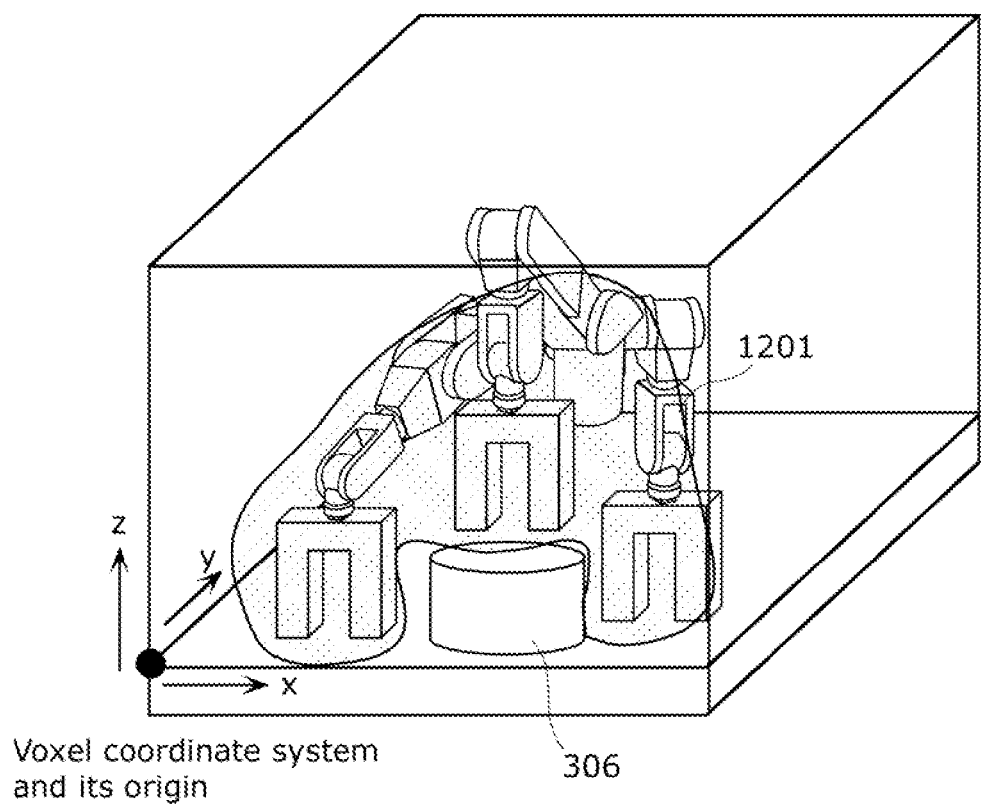
FIG. 13 is a diagram showing an example of a robot motion space identified as a result of the third direct teaching operation in Embodiment 1.
Figure 14:
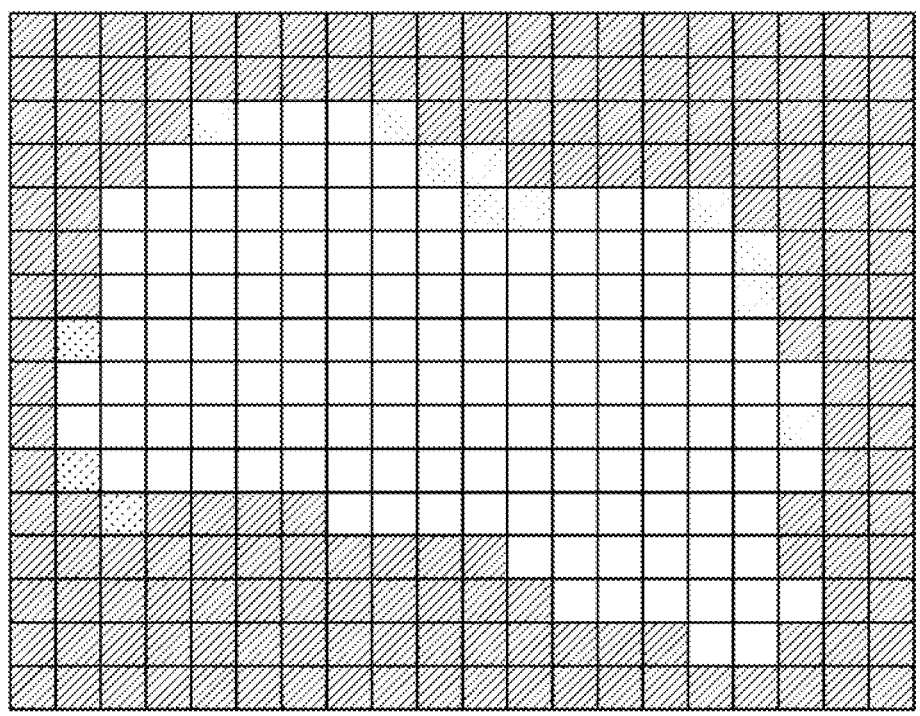
FIG. 14 is a diagram showing a set of voxels composing the robot motion space identified as results of the first to third direct teaching operations in Embodiment 1.

The following describes a process after the third direct teaching operation is completed using FIG. 13 and FIG. 14.

FIG. 13 is a diagram showing an example of a robot motion space 1201 identified as a result of the third direct teaching in Embodiment 1. FIG. 14 is a diagram showing a set of voxels composing the robot motion space identified as results of the first to third direct teaching in Embodiment 1.

Before the following process is performed, the robot motion space storage unit 103 updates the set R_all of voxels with the set R[2] of the voxels obtained as a result of the second direct teaching operation as shown below. The updating is indicated as follows.

$$R\_all \leftarrow R\_all \cup R[2]$$

First, the robot motion space storage unit 103 stores spatial data indicating the set R[3] of the voxels obtained as a result of the third direct teaching operation in a memory or the like.

Next, the spatial difference calculation unit 104 calculates a difference DR between the set R[3] of the voxels obtained as a result of the third direct teaching operation and the set R_all of the voxels obtained as results of the preceding direct teaching operations. Specifically, the spatial difference calculation unit 104 calculates, as the first differential space, a part of the robot motion space identified as a result of the third direct teaching operation. The part is a space having no overlap with the robot motion spaces identified as results of the first and second direct teaching operations. Then, the spatial difference calculation unit 104 calculates, as the difference DR, the number of the voxels composing the calculated first differential space.

The following process is described using FIG. 12 which shows a projection of voxels in three-dimensional space onto a two-dimensional plane for simplicity of description in the same manner as in FIG. 6 and FIG. 10. In FIG. 12, the values of the difference DR and |R_all| are calculated as follows.

$$DR=|R[3]-R\_all|=13$$

$$|R\_all|=137$$

The spatial difference calculation unit 104 provides the feedback unit 105 with the calculated difference DR and |R_all| as differential information.

The feedback unit 105 notifies the operator 301 that the increase ratio of R_all is 9.49% (=13/137). In other words, the feedback unit 105 notifies the operator 301 of the ratio of the number of the voxels composing the first differential space to the number of voxels composing the robot motion spaces identified as results of the first and second direct teaching operations.

The operator 301 can thereby recognize that the increase ratio of the first accessible space is smaller than that the increase ratio as a result of the second direct teaching operation. In other words, the operator 301 can learn that in order to expand the accessible space, it is necessary in the next direct teaching operation to teach the robot a motion path somewhat different from the motion path taught in the preceding and current direct teaching operations. When it is possible to take such a different motion path in the next direct teaching operation, the operator 301 can efficiently expand the accessible space by teaching the robot the different motion path. Optionally, when it is difficult to take such a different motion path for the next direct teaching operation, the operator 301 can immediately indicate completion of the direct teaching.

The process in Step S607 in FIG. 5 shall be described below in more detail using FIG. 15 and FIG. 16.

Figure 15:
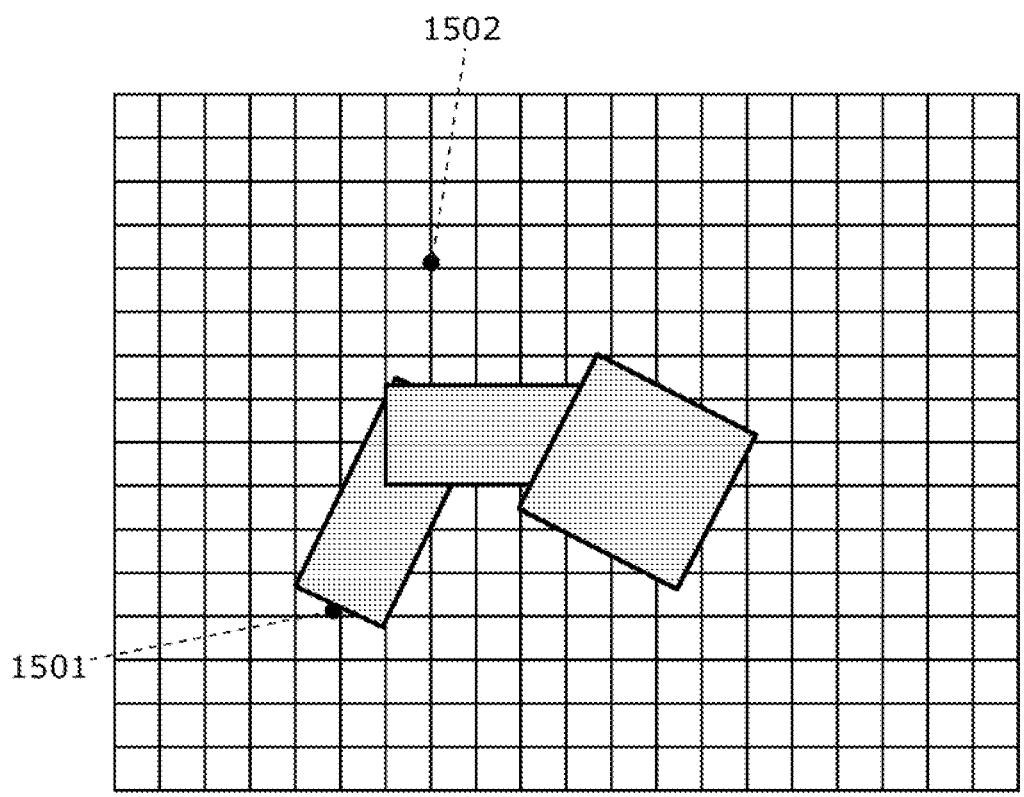
FIG. 15 is a diagram for illustrating an exemplary search condition in Embodiment 1.
Figure 16:
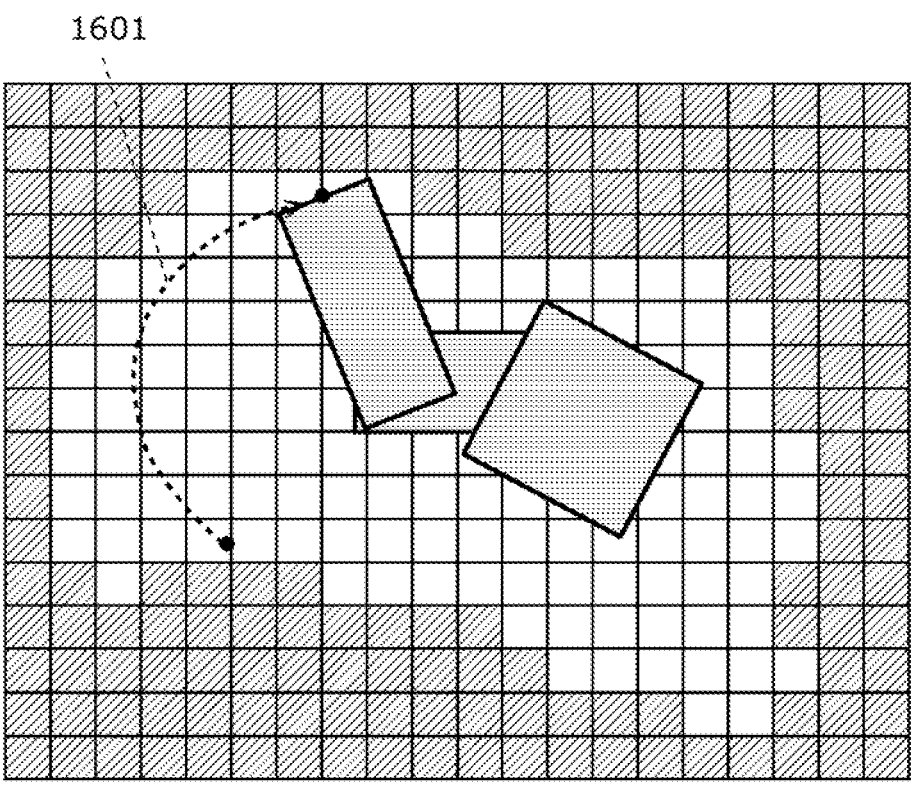
FIG. 16 shows an example of a motion path determined by the motion path search device in Embodiment 1.

FIG. 15 is a diagram for illustrating an exemplary search condition in Embodiment 1. FIG. 16 shows an example of a motion path determined by the motion path search device 100 in Embodiment 1. FIG. 15 and FIG. 16 illustrate a projection of three-dimensional space on a two-dimensional plane for simplicity of description.

As shown in FIG. 15, the path search unit 106 searches for a motion path under a search condition that the end of the movable part 508 of the robot 302 is moved from a starting point 1501 to an end point 1502 in the shortest time. As shown in FIG. 16, the accessible space identified as a result of the direct teaching operations by the operator 301 can be used as a search space for path searching by the motion path search device 100 in Embodiment 1. With this, the path search unit 106 can determine an arc-like path as shown in FIG. 16 which allows the vertical articulated robot to move in the shortest time as a motion path 1601.

In this manner, the motion path search device 100 in Embodiment 1 can provide the operator 301 with information regarding the first differential space which is a part of the robot motion space identified as a result of the current direct teaching operation, and the part is a space having no overlap with any of the robot motion spaces identified as results of the preceding direct teaching operations. Thus, the operator can perform the next direct teaching operation with reference to the provided information. As a result, an accessible space can be obtained and efficiently expanded through direct teaching operations. For example, an accessible space having a volume can be determined through the less number of direct teaching operations than when a conventional technique is used.

It should be noted that in Embodiment 1, the feedback unit 105 need not notify the operator 301 of the ratio of the numbers of voxels. For example, the feedback unit 105 may notify the operator 301 of the numbers the voxels instead. Furthermore, for example, the feedback unit 105 may directly and visually show the operator 301 how the first accessible space has been expanded. For example, the feedback unit 105 may present an image showing the information as seen in FIG. 8, FIG. 10, or FIG. 14 on a display at the end of each direct teaching operation. With this, the operator 301 can directly perceive which part in the three-dimensional space the robot 302 should be moved through in order to expand the accessible space most.

Embodiment 2

Embodiment 2 of the present disclosure shall be described below with reference to the drawings. The description of the part in common with Embodiment 1 will not be repeated herein.

A motion path search device 1700 in Embodiment 2 is different from the motion path search device 100 in Embodiment 1 mainly in that the motion path search device 1700 also uses a space swept through by the body of the operator 301 in direct teaching as a search space for a motion path.

Figure 17:
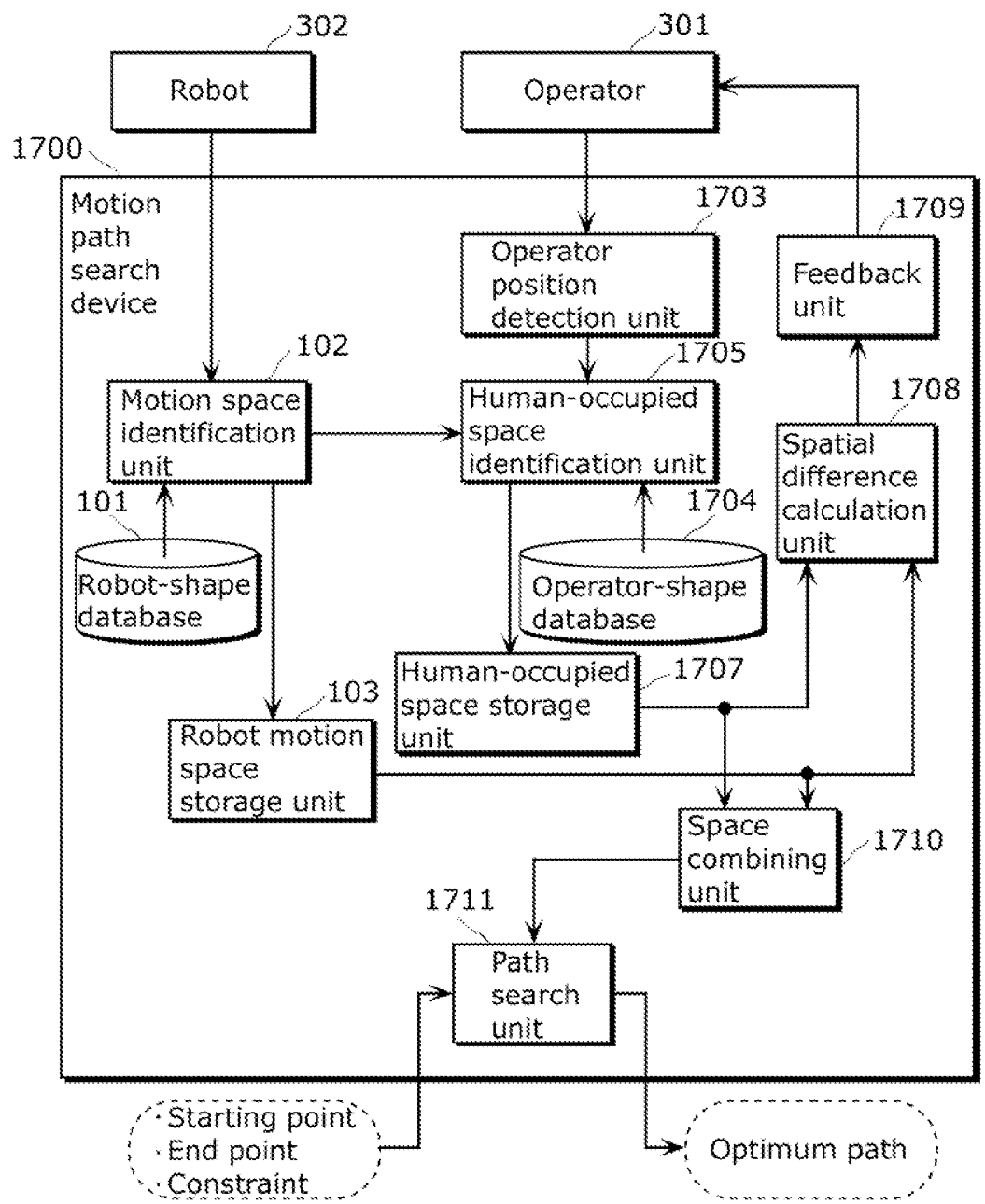
FIG. 17 is a block diagram showing a functional configuration of a motion path search device in Embodiment 2.

FIG. 17 is a block diagram showing a basic functional configuration of the motion path search device 1700 in Embodiment 2. The components in common with those in FIG. 1 are denoted with the same reference signs in FIG. 17 and the description thereof is not repeated herein.

As shown in FIG. 17, the motion path search device 1700 includes a robot-shape database 101, a motion space identification unit, 102, and a robot motion space storage unit 103 as is the case with the motion path search device 100 in Embodiment 1 shown in FIG. 1. The motion path search device 1700 further includes an operator position detection unit 1703, an operator-shape database 1704, a human-occupied space identification unit 1705, a human-occupied space storage unit 1707, a spatial difference calculation unit 1708, a feedback unit 1709, a space combining unit 1710, and a path search unit 1711.

The operator position detection unit 1703 detects a three-dimensional position of at least a portion of the body of the operator 301. In Embodiment 2, the operator position detection unit 1703 detects a three-dimensional position of an elbow of the operator 301 teaching a motion to a robot 302. The portion for which the operator position detection unit 1703 detects a three-dimensional position need not be an elbow and may be a joint area such as a shoulder or a wrist instead. Optionally, the operator position detection unit 1703 may detect a three-dimensional position of another portion such as a shoulder or a wrist in addition to the three-dimensional position of an elbow.

The operator-shape database 1704 stores operator-shape data indicating the shape of at least a portion of the body of the operator 301. In Embodiment 2, the operator-shape database 1704 stores operator-shape data indicating the shape of a forearm of the operator 301. Optionally, the operator-shape database 1704 may further store operator-shape data indicating the shape of an upper arm of the operator 301. Optionally, the operator-shape database 1704 may further store operator-shape data indicating the shape of the entire body of the operator 301.

The human-occupied space identification unit 1705 corresponds to a second space identification unit. The human-occupied space identification unit 1705 identifies, as a second space (hereinafter referred to as a "human-occupied space"), a three-dimensional space swept through by at least a portion of the body of the operator 301 in each direct teaching operation. In Embodiment 2, the human-occupied space identification unit 1705 identifies a three-dimensional space swept through by the forearm of the operator 301 in direct teaching as a human-occupied space.

The human-occupied space storage unit 1707 handles the human-occupied space identified by the human-occupied space identification unit 1705. Specifically, for example, the human-occupied space storage unit 1707 includes a memory or the like and stores spatial data indicating the identified human-occupied space in the memory or the like. Optionally, the human-occupied space storage unit 1707 may store spatial data indicating a human-occupied space in another storage area such as an external storage unit.

The spatial difference calculation unit 1708 calculates a second differential space in addition to a first differential space, which is calculated as in Embodiment 1. Here, the second differential space is a part of the human-occupied space identified as a result of the current direct teaching operation, and has no overlap with any of the human-occupied spaces identified as results of preceding direct teaching operations.

The feedback unit 1709 provides the operator 301 with feedback information regarding the second differential space in addition to the feedback information regarding the first differential space.

The space combining unit 1710 combines a first accessible space and a second accessible space. In other words, the space combining unit 1710 calculates the union of a first accessible space and a second accessible space. The first accessible space is a combination of robot motion spaces identified as results of direct teaching operations. The second accessible space is a combination of human-occupied spaces identified as results of the direct teaching operations.

The path search unit 1711 searches for a motion path of the movable part 508 of the robot 302 not within the first accessible space but within the space resulting from the combining by the space combining unit 1710.

Next, a scene in which the motion path search device 1700 is used shall be described.

Figure 18:
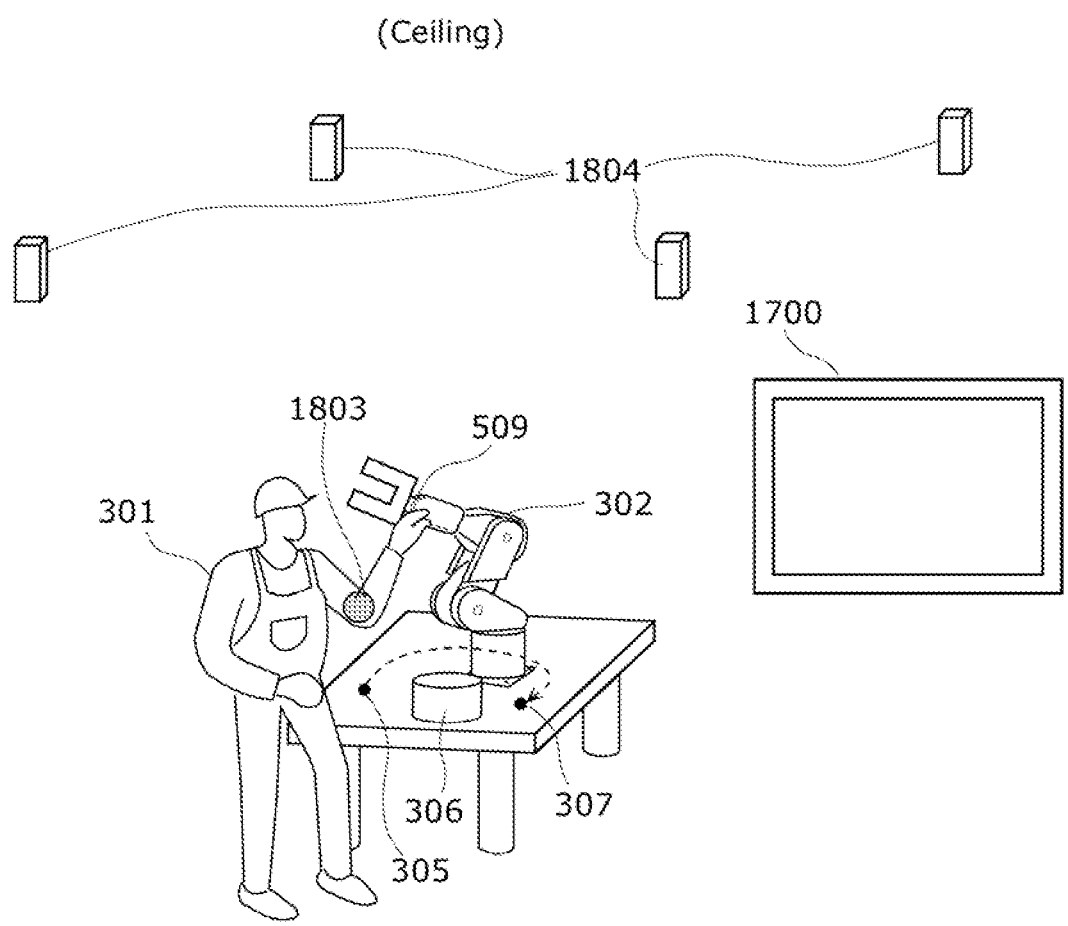
FIG. 18 shows a scene in which the motion path search device is used in Embodiment 2.

FIG. 18 shows a scene in which the motion path search device 1700 is used in Embodiment 2. In FIG. 18, the operator 301 grasps a handle part with a hand. The handle part is a part of the robot 302. The operator 301 is teaching a motion to the robot 302 by moving the movable part of the robot 302 from a starting point 305 to an end point 307, avoiding bringing the movable part into contact with an obstacle 306.

A three-dimensional position measuring device 1803 is mounted on an elbow of the operator 301. In addition, a position sensing device 1804 is installed in the work environment (for example, on the ceiling or the wall of the room where the robot 302 is installed). The three-dimensional position measuring device 1803 and the position sensing device 1804 provide a known indoor global positioning system (GPS) using an ultra-wide band (UWB), for example. In other words, the operator position detection unit 1703 includes the three-dimensional position measuring device 1803 and the position sensing device 1804. The position sensing device 1804 detects a three-dimensional position of a portion of the body of the operator 301 where the three-dimensional position measuring device 1803 is mounted.

Next, operations of the motion path search device 1700 having the above-described configuration shall be described below.

Figure 19:
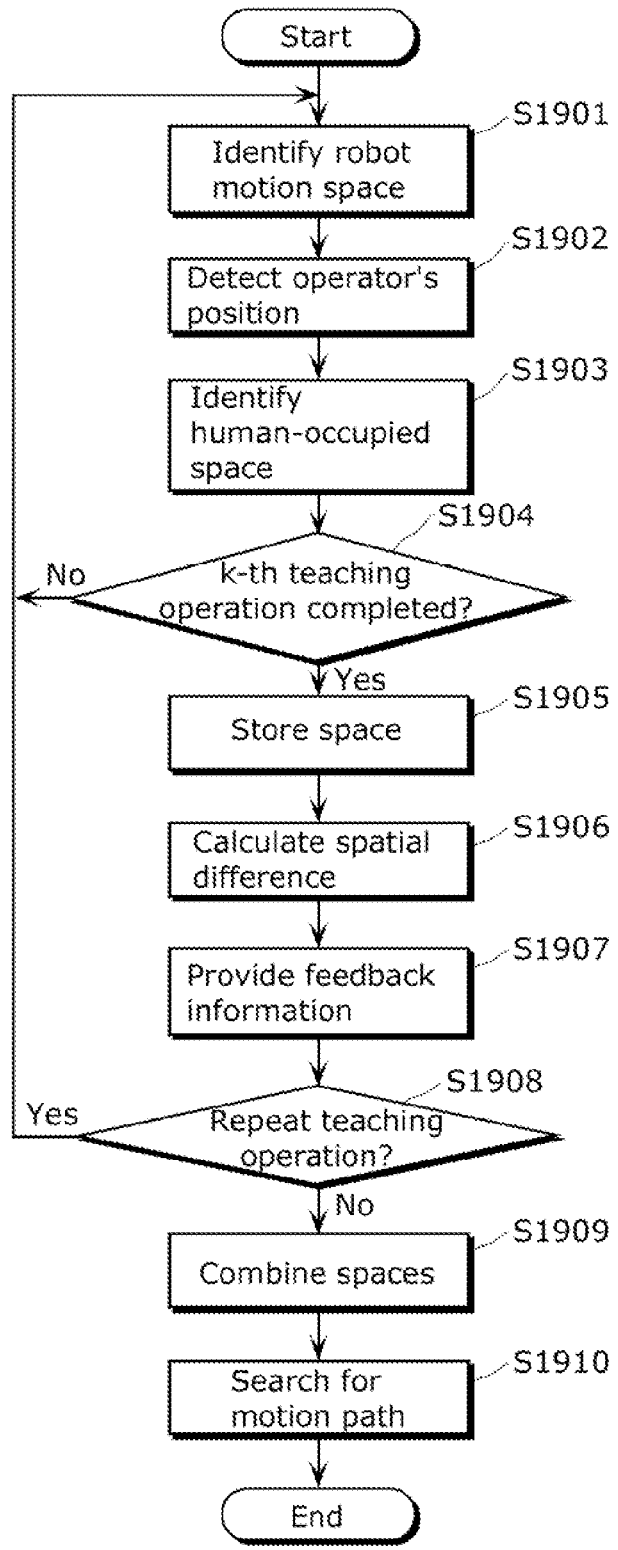
FIG. 19 is a flowchart showing a process of searching for a motion path in Embodiment 2.

FIG. 19 is a flowchart showing the process of searching for a motion path according to Embodiment 2. In the direct teaching described as an example below, the operator 301 teaches the robot 302 a motion from the starting point 305 to the end point 307, moving around the obstacle 306.

Figure 20:
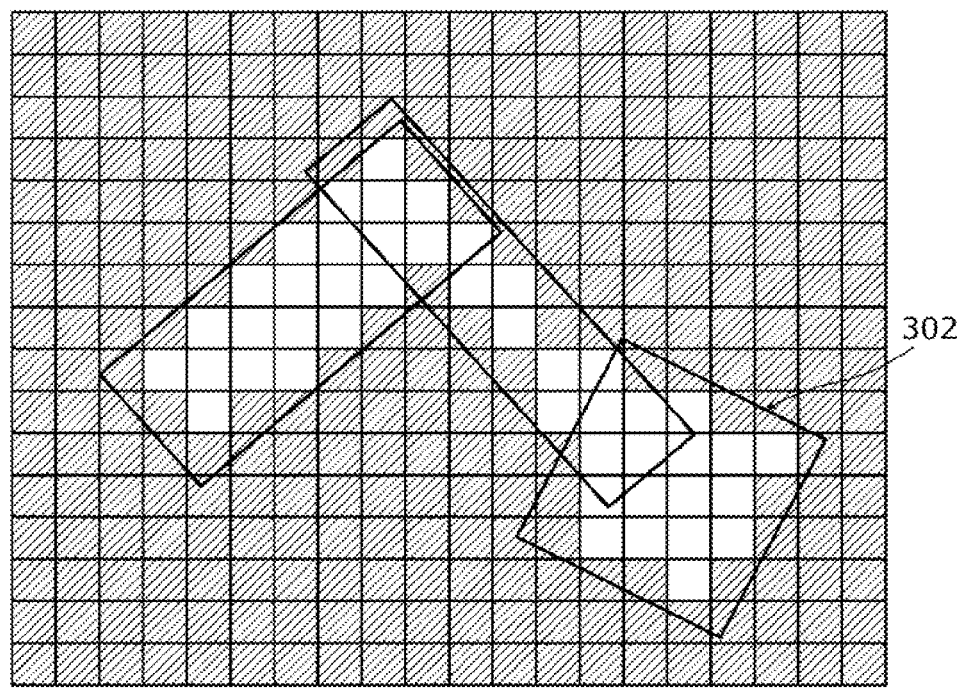
FIG. 20 is a diagram for illustrating inclusion determination by a motion space identification unit in Embodiment 2.

The operator 301 performs direct teaching while grasping the handle part 509 of the robot 302, so that the values (JT1, JT2, 3T3, 3T4, 3T5, JT6) indicating, the angles of the rotational axes change whereby the robot 302 changes its posture. At this time, the motion space identification unit 102 identifies a space occupied by the movable part 508 of the robot 302 as in Step S601 in Embodiment 1 (S1901). Specifically, the motion space identification unit 102 identifies a set R of voxels included in the robot 302 (the voxels having a logical value set to true) as shown in FIG. 20.

Next, the operator position detection unit 1703 detects a three-dimensional position G_h of an elbow of the operator 301 using the three-dimensional position measuring device 1803 and the position sensing device 1804 (S1902).

Next, the human-occupied space identification unit 1705 identifies a space occupied by a forearm of the operator 301 (S1903). Here, before describing the process in Step S1903 in detail, the operator-shape data stored in the operator-shape database shall be described using FIG. 21.

Figure 21:
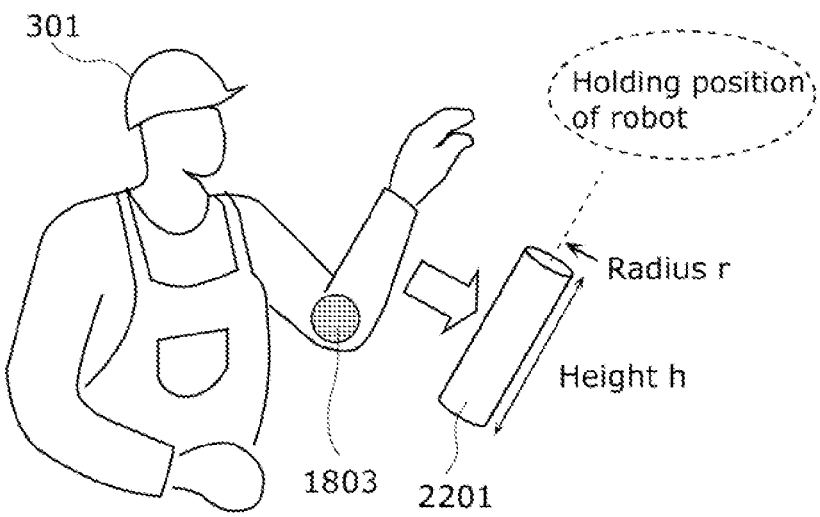
FIG. 21 shows an example of an operator-shape data stored in an operator-shape database in Embodiment 2.

FIG. 21 shows an example of an operator-shape data stored in an operator-shape database 1704 in Embodiment 2. The operator-shape database 1704 stores operator-shape data indicating an approximation of a forearm of the operator 301. For example, the forearm of the operator 301 is indicated using a three-dimensional model 2201 having a cylindrical shape as shown in FIG. 21. The three-dimensional model 2201 having a cylindrical shape is defined by two numerical parameters (a radius r and a height h).

In Embodiment 2, for example, the radius r and the height h each have a value previously entered by the operator 301 through an input unit not shown in the drawings. The three-dimensional model 2201 need not be defined by the radius r and the height h. For example, the three-dimensional model may be defined by a circumferential length and a height.

The radius r may be the radius of the section having the shortest circumference of the forearm of the operator 301. It is thus possible to avoid wrongly calculating a space where an obstacle is present as a part of an accessible space due to use of an over-sized model of the forearm of the operator 301.

The three-dimensional model of the forearm of the operator 301 need not have such a cylindrical shape but may have a shape close to the actual shape of the forearm. However, it should be noted that the load of the process of inclusion determination is larger for a three-dimensional model having a more complicated shape. Therefore, the three-dimensional model having such a relatively simple shape as in Embodiment 2 can be used.

The human-occupied space identification unit 1705 thus identifies a space occupied by a forearm of the operator 301 using the operator-shape data stored in the operator-shape database 1704. Specifically, the human-occupied space identification unit 1705 virtually places a three-dimensional model 2201 indicated by the operator-shape data in a three-dimensional space, using the three-dimensional position G_h of the elbow of the operator 301 and the three-dimensional position G_r of the handle part 509 of the robot 302. Then, the human-occupied space identification unit 1705 performs inclusion determination for the three-dimensional model placed in the three-dimensional space.

Figure 22:
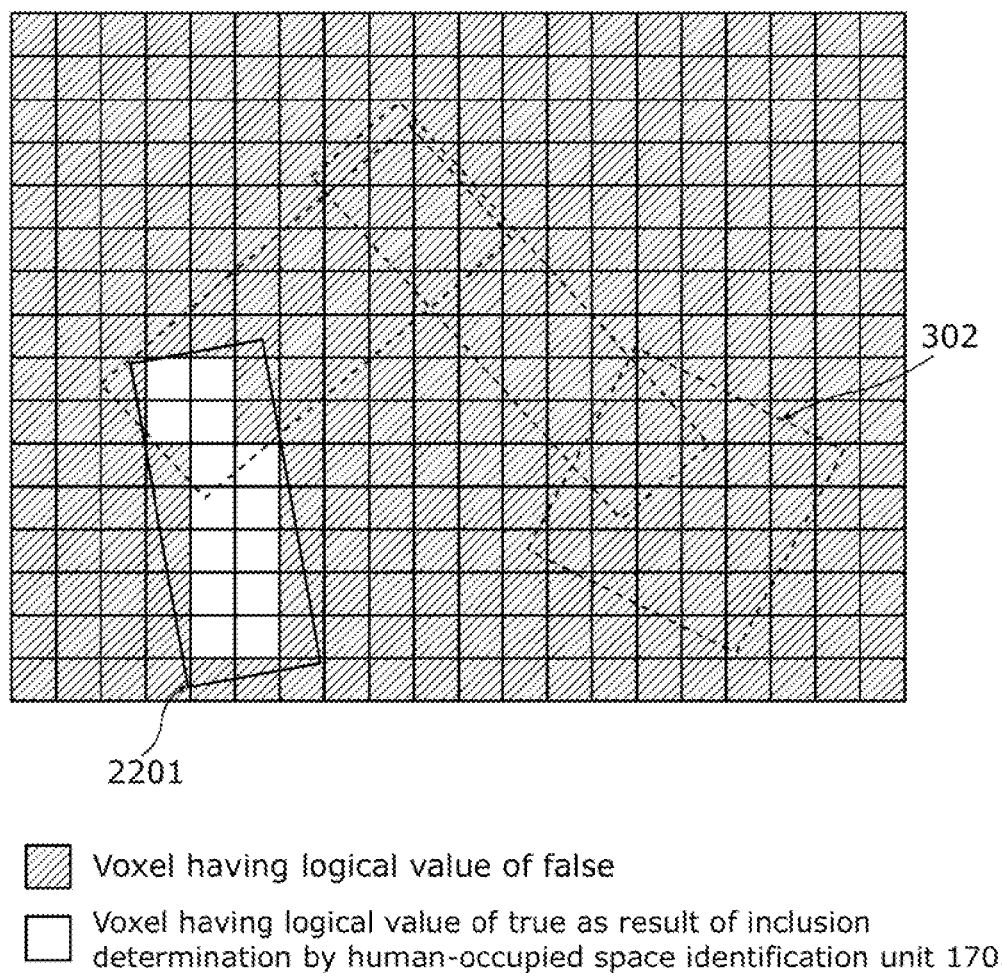
FIG. 22 is a diagram for illustrating inclusion determination by a human-occupied space identification unit in Embodiment 2.

FIG. 22 is a diagram for illustrating inclusion determination by the human-occupied space identification unit 1705 in Embodiment 2. As shown in FIG. 22, the human-occupied space identification unit 1705 sets the logical value of the voxels included in the three-dimensional model 2201 among the voxels composing the three-dimensional space to true. The set H of the voxels determined as being included in the three-dimensional model 2201 of the operator 301 by the human-occupied space identification unit 1705 is represented by Expression (6) below.

$$H = \cup \{V(x,y,z) | M(x,y,z) = \text{true}\} \qquad \text{Expression (6)}$$

The set H of voxels corresponds to a space occupied by at least a portion of the body of the operator 301 at a point of time in direct teaching.

The process from Steps S1901 to S1903 is repeated until the operator 301 indicates completion of the k-th direct teaching operation. In other words, the human-occupied space identification unit 1705 repeats inclusion determination at regular intervals T until an indication of completion of the k-th direct teaching operation is received from the operator 301 (S1904).

Consequently, after the k-th direct teaching operation is completed, the sets R and H of voxels are composed of voxels determined as being included in the robot 302 or the operator 301 at not less than one of the points of time in the k-th direct teaching operation.

The set R of voxels thus obtained corresponds to a robot motion space swept through by the movable part 508 of the robot 302 in the k-th direct teaching operation. The set H of voxels thus obtained corresponds to a human-occupied space swept through by at least a portion of the body of the operator 301 in the k-th direct teaching operation.

Figure 23:
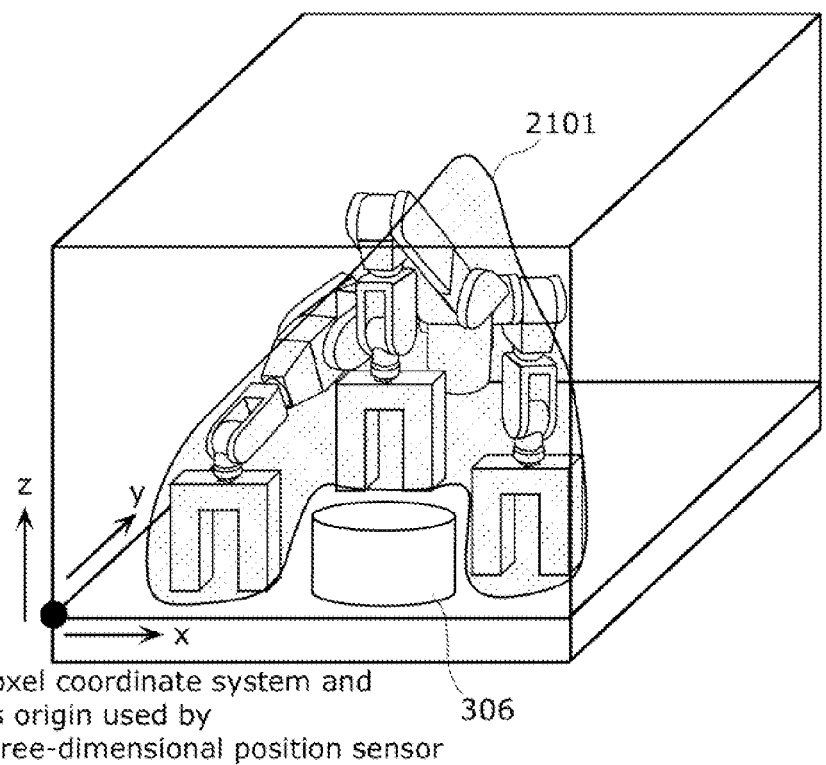
FIG. 23 is a diagram showing an example of a robot motion space identified by the motion space identification unit in Embodiment 2.
Figure 24:
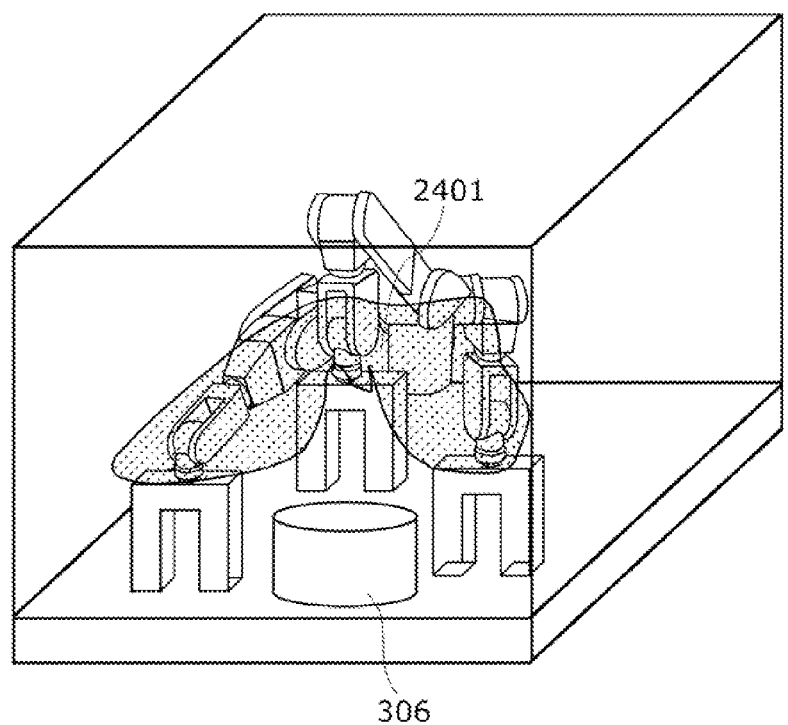
FIG. 24 is a diagram showing an example of a human-occupied space identified by the human-occupied space identification unit in Embodiment 2.

FIG. 23 is a diagram showing an example of a robot motion space 2101 identified by the motion space identification unit 102 in Embodiment 2. FIG. 24 is a diagram showing an example of a human-occupied space 2401 identified by the human-occupied space identification unit 1705 in Embodiment 2.

As shown in FIG. 23 and FIG. 24, after the k-th direct teaching operation, the motion space identification unit 102 and the human-occupied space identification unit 1705 identify the robot motion space 2101 and the human-occupied space 2401, respectively.

The robot motion space storage unit 103 and the human-occupied space storage unit 1707 respectively store, in a memory or the like, spatial data indicating the robot motion space 2101 and the spatial data indicating the human-occupied space 2401 identified in the k-th direct teaching operation (S1905).

Next, the spatial difference calculation unit 1708 calculates a second differential space in addition to a first differential space (S1906). Here, the second differential space is a part of the human-occupied space identified as a result of the current direct teaching operation, and has no overlap with any of the human-occupied spaces identified as results of preceding direct teaching operations. Specifically, the spatial difference calculation unit 1708 calculates the first differential space and the second differential space using, for example, the spatial data stored in the memory or the like.

Next, the feedback unit 1709 provides the operator 301 with information regarding the second differential space in addition to information regarding the first differential space (S1907). Specifically, the feedback unit 1709 provides, as the information regarding the second differential space, the volume ratio of the second differential space to the human-occupied spaces identified as results of the preceding direct teaching operations.

Here, when an indication of repetition of direct teaching operations is received from the operator 301 (Yes in S1908), the process returns to Step S1901 and the (k+1)-th direct teaching operation is performed. When an indication of repetition of direct teaching operations is not received from the operator 301 (No in S1908), the space combining unit 1710 combines the first accessible space and the second accessible space (S1909). The second accessible space is a combination of human-occupied spaces identified as results of the first to k-th direct teaching operations.

Then, the path search unit 1711 searches for a motion path of the movable part 508 of the robot 302 within the accessible space resulting from the combining (S1910).

In this manner, the motion path search device 1700 searches for a motion path of the movable part 508 of the robot 302 based on the plurality of direct teaching operations.

The process from Steps S1905 to S1907 in FIG. 19 shall be described below in more detail using FIG. 25.

Figure 25:
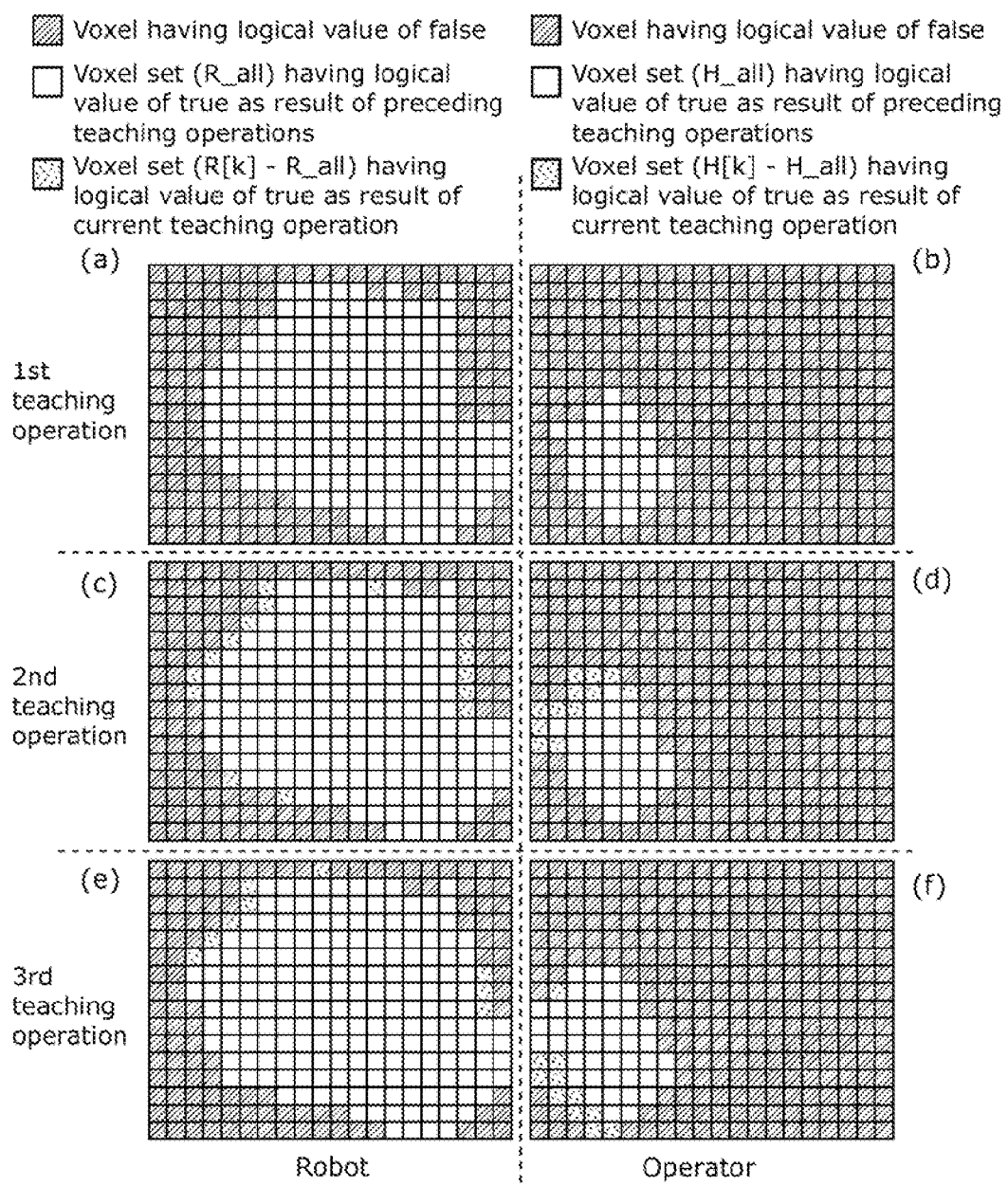
FIG. 25 is a diagram showing a set of voxels composing a first accessible space and a second accessible space identified as results of the first to third direct teaching operations in Embodiment 2.

FIG. 25 is a diagram showing a set of voxels composing a first accessible space and a second accessible space identified as results of the first to third direct teaching operations in Embodiment 2. Specifically, (a) and (b) in FIG. 25 are diagrams respectively showing a set of voxels composing a first accessible space and a second accessible space identified as a result of the first direct teaching operation. (c) and (d) in FIG. 25 are diagrams respectively showing a set of voxels composing a first accessible space and a second accessible space identified as a result of the first to second direct teaching operations. (e) and (f) in FIG. 25 are diagrams respectively showing a set of voxels composing a first accessible space and a second accessible space identified as a result of the first to third direct teaching operations.

Before the first direct teaching, the set R_all of voxels composing the first accessible space and the set H_all of voxels composing the second accessible space are initialized to be ∅ (empty sets).

First, the robot motion space storage unit 103 stores spatial data indicating the set R[1] of the voxels obtained as a result of the first direct teaching operation in a memory or the like. The human-occupied space storage unit 1707 stores spatial data indicating the set H[1] of the voxels obtained as a result of the first direct teaching operation in a memory or the like. Calculation of a first differential space and a second differential space and notification of feedback information are skipped because this direct teaching operation is the first one.

The following describes a process after the second direct teaching operation is completed using (c) and (d) in FIG. 25. Before the following process is performed, the robot motion space storage unit 103 and the human-occupied space storage unit 1707 respectively update the set R_all of voxels with the set R[1] of the voxels and the set H_all of voxels with the set H[1] of the voxels obtained as a result of the first direct teaching operation. The updating is indicated as follows $R\_all \leftarrow R\_all \cup R[1]$ $H\_all \leftarrow H\_all \cup R[1]$ Next, the robot motion space storage unit 103 stores spatial data indicating the set R[2] of the voxels obtained as a result of the second direct teaching operation in a memory or the like. The human-occupied space storage unit 1707 stores spatial data indicating the set H[2] of the voxels obtained as a result of the second direct teaching operation in a memory or the like.

Next, the spatial difference calculation unit 1708 calculates a difference DR between the set R[2] of the voxels obtained as a result of the second direct teaching operation and the set R_all of the voxels obtained as a result of the preceding direct teaching operation. In (c) in FIG. 25, the values of the difference DR and |R_all| are calculated as follows.

$DR = |R[2] - R\_all| = 15$ $|R\_all| = 182$

Furthermore, the spatial difference calculation unit 1708 calculates a difference DH between the set H[2] of the voxels obtained as a result of the second direct teaching operation and the set H_all of the voxels obtained as a result of the preceding direct teaching operation. In (d) in FIG. 25, the values of the difference DH and |H_all| are calculated as follows.

$DH = |H[2] - H\_all| = 11$ $|H\_all| = 33$

The spatial difference calculation unit 1708 provides the feedback unit 1709 with the calculated difference DR, |R_all|, difference DH, and |H_all| as differential information.

The feedback unit 1709 notifies the operator 301 that the increase ratio of R_all is 8.24% (=15/182) and the increase ratio of H_all is 33.33% (=11/33). In other words, the feedback unit 1709 provides information regarding the second differential space in addition to information regarding the first differential space. Here, the information regarding the second differential space is the ratio of the number of voxels composing the second differential space to the number of voxels composing the human-occupied space identified as a result of the first direct teaching operation.

Figure 26:
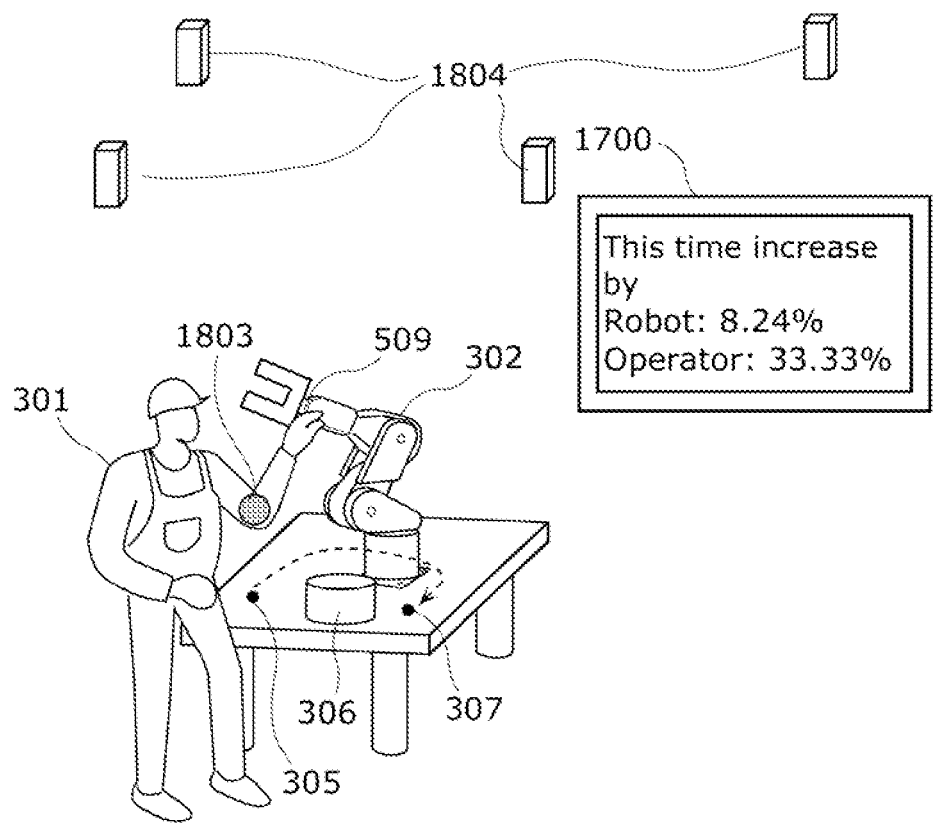
FIG. 26 shows an example of presentation of feedback information in Embodiment 2.

The feedback unit 1709 can use a notification method in which the calculated ratio is shown on a display as shown in FIG. 26, for example. Optionally, the feedback unit 1709 can use a notification method in which the calculated ratio is read out using a synthesized voice.

The following describes a process after the third direct teaching operation is completed using (e) and (f) FIG. 25. Before the following process is performed, the robot motion space storage unit 103 and the human-occupied space storage unit 1707 respectively update the set R_all of voxels with the set R[2] of the voxels and the set H_all of voxels with the set H[2] of the voxels obtained as a result of the second direct teaching operation as shown below.

$R\_all \leftarrow R\_all \cup R[2]$ $H\_all \leftarrow H\_all \cup R[2]$

Next, the robot motion space storage unit 103 stores spatial data indicating the set R[3] of the voxels obtained as a result of the third direct teaching operation in a memory or the like. The human-occupied space storage unit 1707 stores spatial data indicating the set H[3] of the voxels obtained as a result of the third direct teaching operation in a memory or the like.

Next, the spatial difference calculation unit 1708 calculates a difference DR between the set R[3] of the voxels obtained as a result of the third direct teaching operation and the set R_all of the voxels obtained as results of the preceding direct teaching operations. In (e) in FIG. 25, the values of the difference DR and |R_all| are calculated as follows.

$DR = |R[3] - R\_all| = 9$ $|R\_all| = 197$

Next, the spatial difference calculation unit 1708 calculates a difference DH between the set H[3] of the voxels obtained as a result of the third direct teaching operation and the set H_all of the voxels obtained as results of the preceding direct teaching operations. In (f) in FIG. 25, the values of the difference DH and |H_all| are calculated as follows.

$DH = |H[3] - H\_all| = 11$ $|H\_all| = 44$

The spatial difference calculation unit 1708 provides the feedback unit 1709 with the calculated difference DR, |R_all|, difference DH, and |H_all| as differential information.

The feedback unit 1709 notifies the operator 301 that the increase ratio of R_all is 4.57% (=9/197) and the increase ratio of H_all is 25.00% (=11/44). In other words, the feedback unit 1709 provides information regarding the second differential space in addition to information regarding the first differential space. Here, the information regarding the second differential space is the ratio of the number of voxels composing the second differential space to the number of voxels composing the human-occupied spaces identified as results of the first and second direct teaching operations.

The operator 301 thereby learns decrease in the increase ratio of the accessible space due to the robot motion space. When it is possible to make some change to the motion path of the movable part 508 in direct teaching, the operator 301 can efficiently expand the accessible space by making the change to the motion path in the next direct teaching operation.

Optionally, when it is difficult to change the motion path of the movable part 508, the operator 301 can efficiently expand the accessible space by changing the way of grasping the handle part 509 of the robot 302 for the next direct teaching operation.

Optionally, when the operator 301 determines that neither the first accessible space nor the second accessible space can be expanded any more, the operator 301 can immediately indicate completion of direct teaching.

As described above, the motion path search device 1700 in Embodiment 2 can obtain an accessible space using a robot motion space and a human-occupied space swept through by the robot 302 and at least a portion of the body of the operator 301 in direct teaching, respectively. In other words, a space not swept through by the robot 302 in direct teaching can also be included in an accessible space. Since the obtained accessible space is a space expanded from the space swept through by the robot 302, it is possible to determine a motion path with higher optimality.

Furthermore, the operator 301 can be provided with the information on the second differential space in addition to the information on the first differential space. The second differential space is a part of the human-occupied space identified as a result of the current direct teaching operation, and has no overlap with the human-occupied spaces identified as results of the preceding direct teaching operations. This allows the operator 301 to determine, for example, which of the paths, that is, the path of the movable part 508 of the robot 302 and the path of the body of the operator 301, should be deliberately changed in order to efficiently expand the accessible space in the next direct teaching operation. As a result, the accessible space can be efficiently expanded through the direct teaching operations.

Embodiment 3

Embodiment 3 of the present disclosure shall be described below with reference to the drawings. The description of the part in common with Embodiment 2 will be omitted herein as appropriate.

A motion path search device according to Embodiment 3 is different from the motion path search device in Embodiment 2 in that the information to be provided to the operator 301 varies depending on a result of comparison between a first differential space and a second differential space. The functional configuration of the motion path search device in Embodiment 3 is not illustrated in the drawings because it is in common with that in Embodiment 2.

In Embodiment 3, a feedback unit 1709 provides one of information regarding a first differential space and information regarding a second differential space depending on a result of comparison between the first differential space and the second differential space. Specifically, the feedback unit 1709 provides information regarding the first differential space when the first differential space is smaller than the second differential space. On the other hand, the feedback unit 1709 provides information regarding the second differential space when the second differential space is smaller than the first differential space. More specifically, the feedback unit 1709 compares increase in the set R_all of voxels with the increase in the set H_all of voxels. Then, the feedback unit 1709 provides the operator 301 with information to allow the operator 301 to deliberately change the motion path for a direct teaching operation depending on the result of the comparison.

Specifically, when the increase in the first accessible space is smaller, the feedback unit 1709 provides the operator 301 with feedback to instruct the operator 301 to "change the motion path of the robot for the direct teaching operation". In contrast, when the increase in the second accessible space is smaller, the feedback unit 1709 provides the operator 301 with feedback to instruct the operator 301 to "change the way of grasping the handle part for the direct teaching operation".

For example, when DR=15 and DH=11 as shown in (c) and (d) in FIG. 25, DH is smaller than DR, and therefore the feedback unit 1709 presents a message on a display to instruct the operator 301 to "change the way of grasping the handle part for the direct teaching operation".

As another example, when DR=9 and DH=11 as shown in (e) and (f) in FIG. 25, DR is smaller than DH, and therefore the feedback unit 1709 presents a message on a display to instruct the operator 301 to "change a motion path of the robot for the direct teaching operation".

The motion path search device 1700 in Embodiment 3 thus allows the operator 301 to quickly determine which of the motion path of the movable part 508 and the way of grasping the robot 302 should be changed for the next direct teaching operation so that the accessible space can be efficiently expanded.

Embodiment 4

Embodiment 4 of the present disclosure shall be described below with reference to the drawings. The description of the part in common with Embodiment 2 will be omitted herein as appropriate.

A motion path search device 2800 in Embodiment 4 is different from the motion path search device 1700 in Embodiment 3 in that the motion path search device 2800 provides the operator 301 with information on the posture of the operator 301 when a direct teaching operation is started.

Figure 27:
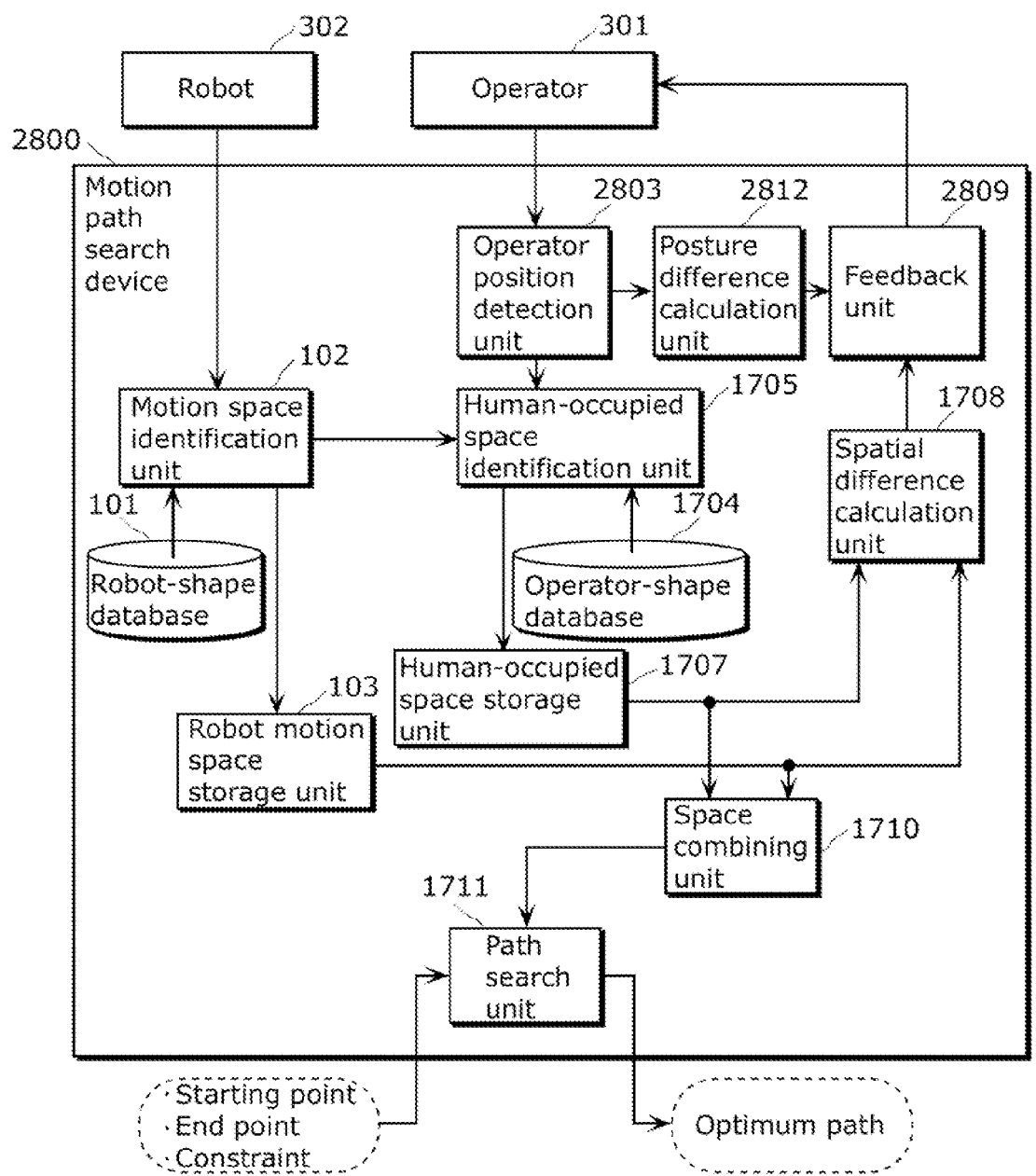
FIG. 27 is a block diagram showing a functional configuration of a motion path search device in Embodiment 4.

FIG. 27 is a block diagram showing a basic functional configuration of a motion path search device in Embodiment 4. The components in common with those in FIG. 17 are denoted with the same reference signs in FIG. 27 and the description thereof is not repeated herein.

The operator position detection unit 2803 further detects a position of the operator 301. Specifically, the operator position detection unit 2803 detects a direction of the three-dimensional position measuring device 1803 as seen from the handle part 509 at the start of a teaching operation. In Embodiment 4, a three-dimensional position measuring device 1803 is mounted on an elbow of the operator 301. The operator position detection unit 2803 therefore detects, as a posture of the operator 301, the direction of the elbow of the operator 301 as seen from the handle part 509.

Figure 28:
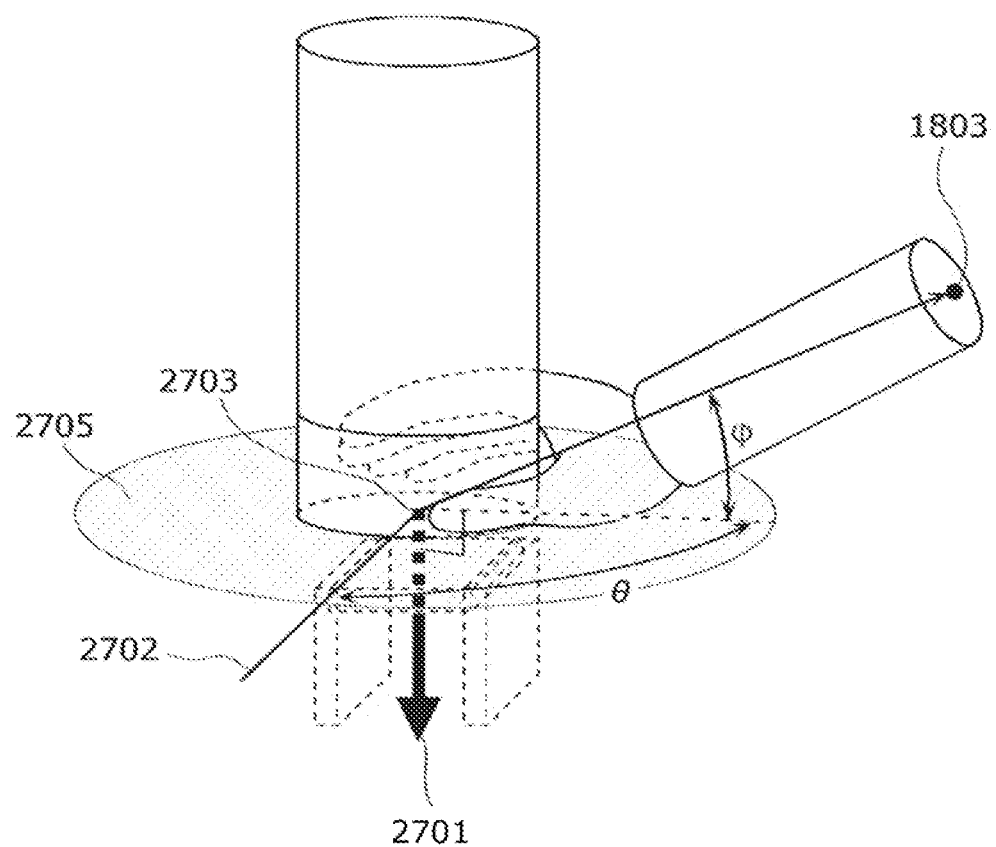
FIG. 28 is a diagram for illustrating a posture of an operator in Embodiment 4.

The direction of the three-dimensional position measuring device 1803 is represented by two rotational angle θ and φ as shown in FIG. 28. The value of θ corresponds to a first value, and the value of φ corresponds to a second value.

More specifically, a center position 2703 of the handle part 509 and a normal vector 2701 to a virtual plane 2705 where the handle part 509 is located are known from the posture of the robot 302. The direction of the normal vector 2701 corresponds to the direction of the axis of the handle part 509.

Then, given that the reference position of θ (θ=0) is set at a fixed position 2702 on the plane 2705 and the reference position of φ (φ=0) is set on the plane 2705, the operator position detection unit 2803 can determine θ ($0 \leq \theta < 2n$) and φ ($-n/2 \leq \phi \leq n/2$) from the position of the three-dimensional position measuring device 1803.

In Embodiment 4, θ is measured counterclockwise with respect to the distal end of the movable part 508, and the direction toward the distal end of the movable part 508 is measured as a positive angle φ, and the opposite direction as a negative angle φ.

The angles θ and φ indicating the direction of the three-dimensional position measuring device 1803 as seen from the handle part 509 at the start of the k-th teach operation are denoted θ(k) and φ(k), respectively.

A posture difference calculation unit 2812 calculates the difference between the value indicating the posture of the operator 301 at the start of the last direct teaching operation and the value indicating the posture of the operator 301 at the start of the current direct teaching operation. In Embodiment 4, the postures of the operator 301 are the directions of the elbow of the operator 301 as seen from the handle part 509. Specifically, the posture difference calculation unit 2812 calculates the difference in θ and the difference in φ.

The feedback unit 2809 provides the operator 301 with information regarding the posture of the operator 301, based on the calculated difference, at the start of a direct teaching operation. Specifically, the feedback unit 2809 provides information regarding the posture of the operator 301 based on a result of the comparison between the difference in θ and the difference in φ.

Optionally, the feedback unit 2809 provides information regarding the posture of the operator 301 at the start of the current direct teaching operation when the second differential space is smaller than the first differential space as a result of the last direct teaching operation.

Next, operations of the motion path search device 2800 having the above-described configuration shall be described below.

Figure 29:
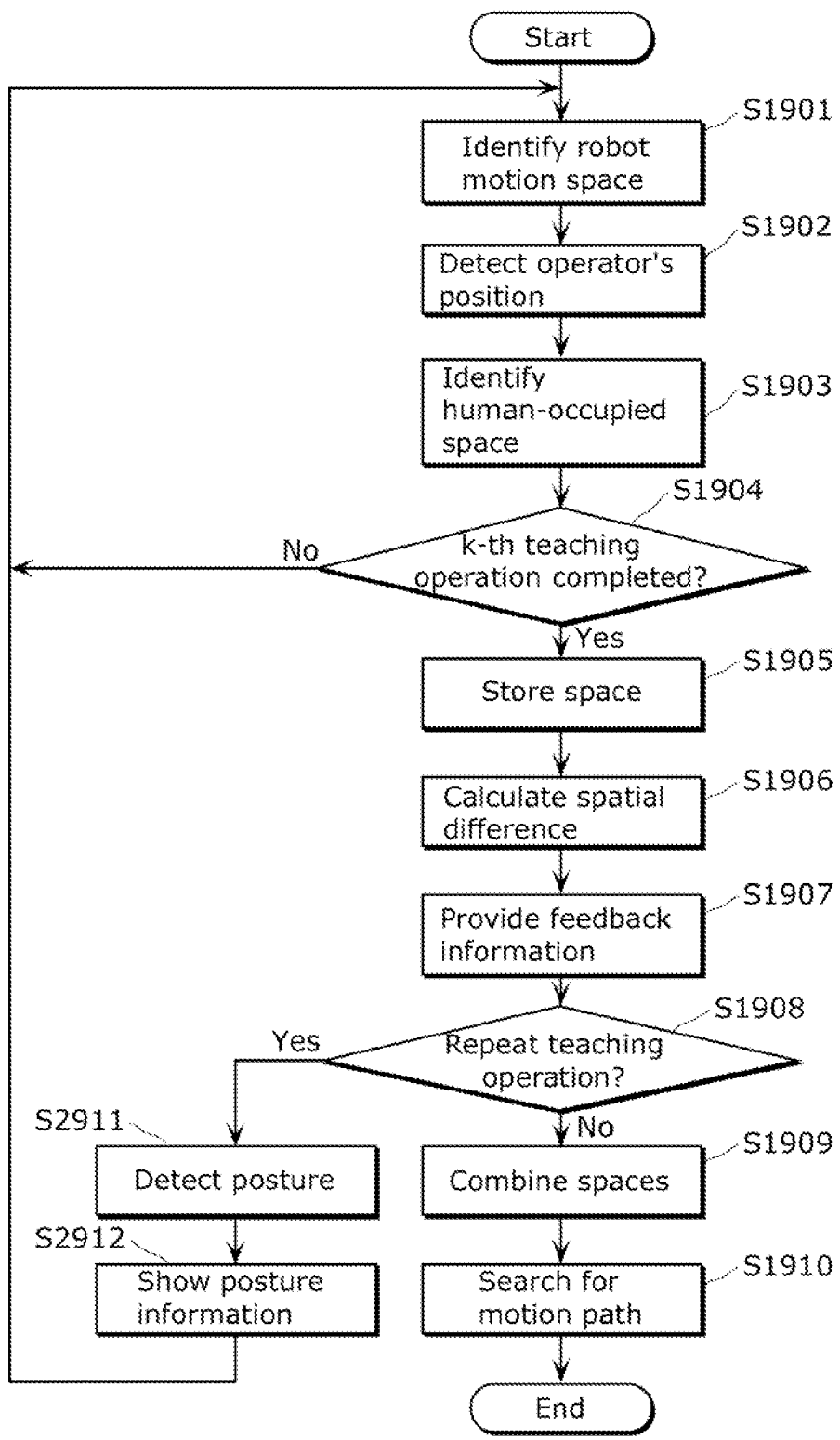
FIG. 29 is a flowchart showing a process of searching for a motion path in Embodiment 4.

FIG. 29 is a flowchart showing the process of searching for a motion path according to Embodiment 4. The steps in common with those in FIG. 19 are denoted with the same reference signs in FIG. 29 and the description thereof is omitted herein as appropriate.

When increase of H_all in voxels is smaller than increase of R_all in voxels, the feedback unit 2809 shows a message on a display to instruct the operator 301 to "change the way of grasping for the direct teaching operation" (S1907).

Here, when a direct teaching operation is further performed (Yes in S1908), the operator position detection unit 2803 detects the posture of the operator 301 (S2911). Specifically, the operator position detection unit 2803 measures θ and φ when, for example, the operator 301 presses a button to indicate that the (k+1)-th direct teaching operation is started.

Furthermore, the feedback unit 2809 obtains θ(k+1), φ(k+1), θ(k), and φ(k) from the operator position detection unit 2803 immediately before the operator 301 starts the (k+1)-th direct teaching operation.

Next, the feedback unit 2809 shows information on the posture of the operator 301 on the display (S2912) in the following manner.

When $|\theta(k+1)-\theta(k)|<|\phi(k+1)-\phi(k)|$, the feedback unit 2809 shows a message on the display to instruct the operator 301 to "rotate the wrist with the elbow retained at the position". In contrast, when $|\phi(k+1)-\phi(k)| \leq |\theta(k+1)-\theta(k)|$, the feedback unit 2809 shows a message on the display to instruct the operator 301 to "change the position of the elbow with the wrist retained at the angle".

The motion path search device 2800 according to Embodiment 4 thus allows the operator 301 to easily learn how the arm or the hand should be changed when instructed to change the way of grasping the robot, so that the accessible space can be efficiently expanded.

In Embodiment 4, the feedback unit 2809 need not show the message to instruct the operator 301 to "rotate the wrist with the elbow at the position". For example, the feedback unit 2809 may show a stored image to indicate a way of grasping as information regarding the posture of the operator.

Optionally, the posture difference calculation unit 2812 need not calculate both the difference in the angle θ and the difference in the angle φ, and may calculate one of the difference in the angle θ and the difference in the angle φ. For example, the posture difference calculation unit 2812 may calculate only the difference in the angle θ. In this case, for example, the feedback unit 2809 may provide the operator 301 with information to instruct the operator 301 to change the hand to grasp the handle part 509 from one to the other (for example, from the right hand to the left hand) when the difference is smaller than a threshold.

Although only some exemplary embodiments of the motion path search device have been described in detail in the present disclosure, these exemplary embodiments are not intended to limit the inventive concept of the present disclosure. Those skilled in the art will readily appreciate that many modifications of the exemplary embodiments or embodiments in which some of the constituent elements of the exemplary embodiments are combined are possible without materially departing from the novel teachings and advantages of the inventive concept. All such modifications and embodiments are within the scope of the inventive concept.

For example, the present disclosure is applicable also to the case where the operator 301 performs direct teaching using a leg instead of the arm as shown in Embodiments 1 to 4. In this case, the human-occupied space identification unit 1705 identifies a space swept through by the leg of the operator 301 in direct teaching, and the posture difference calculation unit 2812 calculates a difference between values indicating the postures of the leg.

The motion path search device according to any of Embodiments 1 to 4 of the present disclosure need not include all of the constituent elements included in the motion path search device described in the respective exemplary embodiments. For example, the motion path search device may be configured as shown in FIG. 30.

Figure 30:
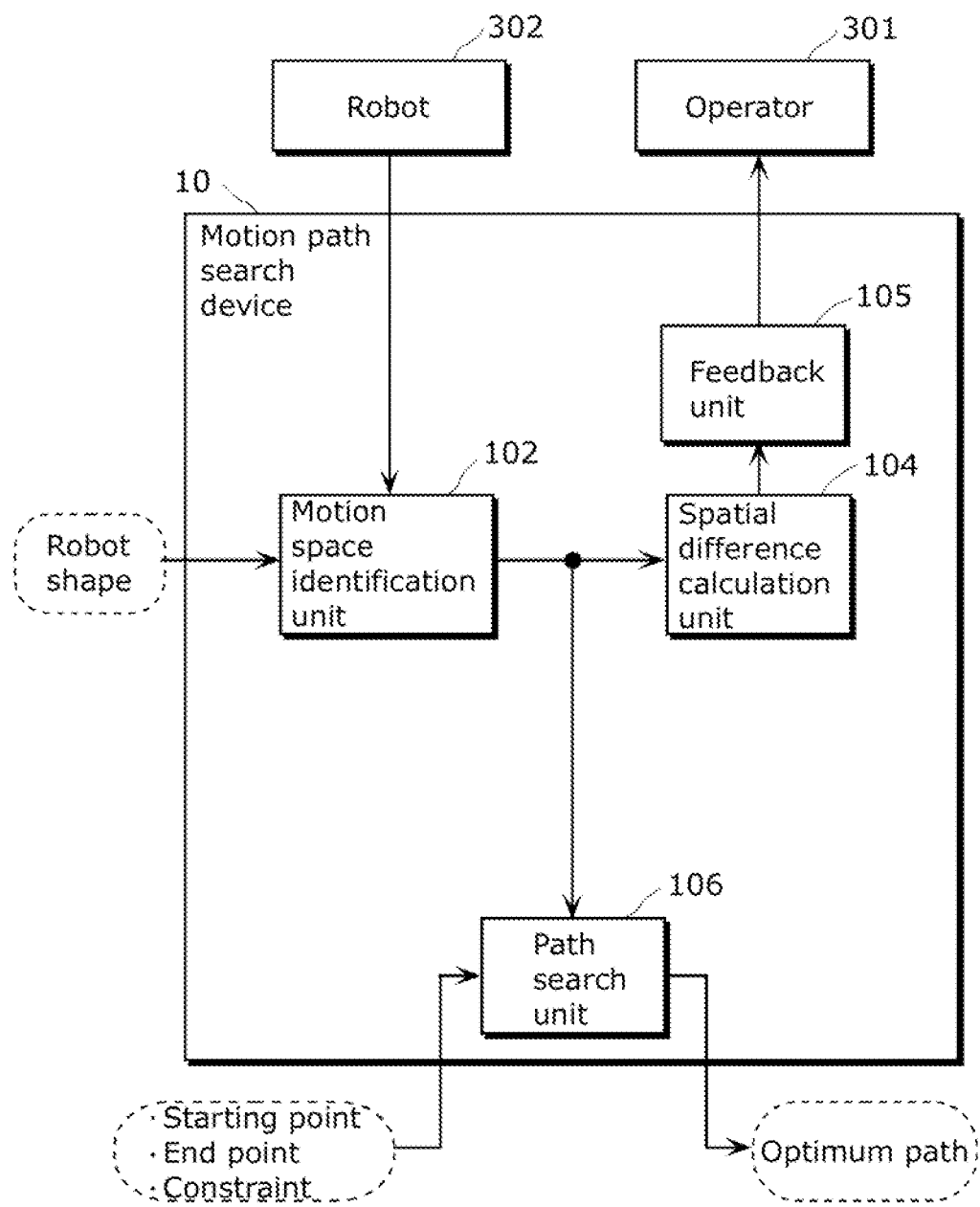
FIG. 30 is a block diagram showing a functional configuration of a motion path search device in an exemplary embodiment.

FIG. 30 is a block diagram showing a functional configuration of the motion path search device 10 according to an embodiment of the present disclosure. The motion path search device 10 shown in FIG. 30 includes a motion space identification unit 102, a spatial difference calculation unit 104, a feedback unit 105, and a path search unit 106. In other words, the motion path search device 10 need not include the robot-shape database 101 or the robot motion space storage unit 103. In this case, the motion path search device 10 may obtain robot-shape data via, for example, a communication unit or an input unit not shown in the drawings, and the motion space identification unit 102 holds the spatial data indicating the robot motion space previously identified.

Figure 31:
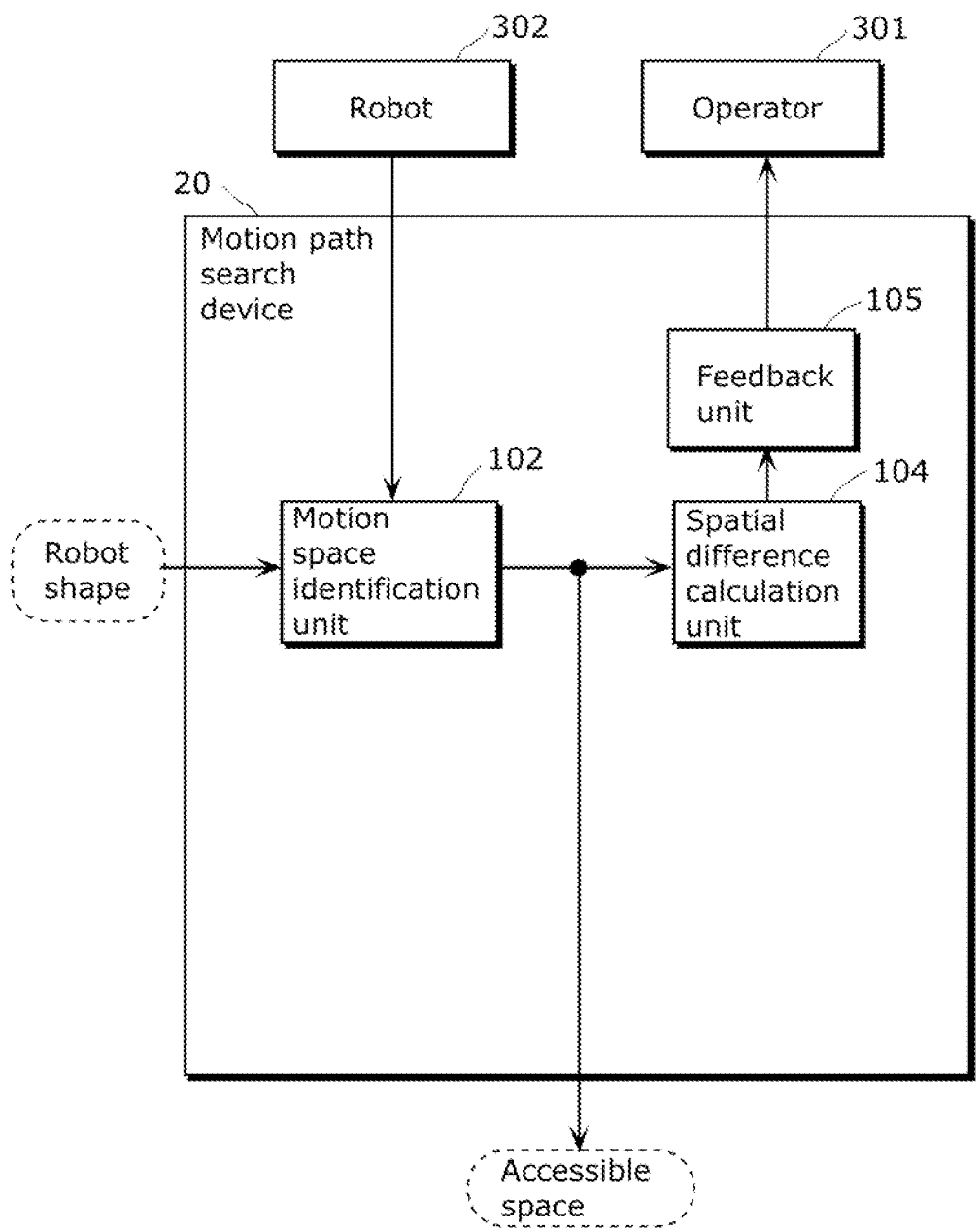
FIG. 31 is a block diagram showing a functional configuration of an accessible space output device in an exemplary embodiment.
Figure 32:
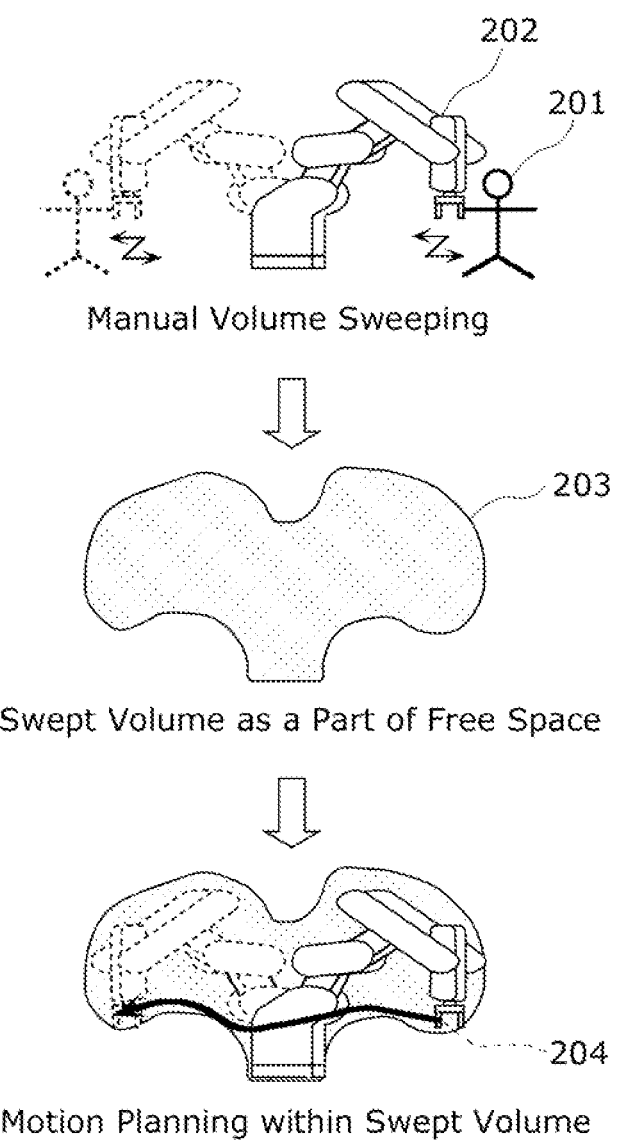
FIG. 32 schematically shows conventional processing for obtaining an accessible space and conventional processing for searching for an optimum path.

Furthermore, another possible embodiment of the present disclosure is an accessible space output device 20. FIG. 31 is a block diagram showing a functional configuration of the accessible space output device 20 according to an exemplary embodiment of the present disclosure. The accessible space output device 20 shown in FIG. 31 includes a motion space identification unit 102, a spatial difference calculation unit 104, and a feedback unit 105. In this case, the motion space identification unit 102 shows the identified robot motion space on the display, so that the accessible space output device 20 can present the accessible space to the operator 301. Optionally, the motion space identification unit 102 may output the identified accessible space to a motion path search device. This allows the motion path search device to determine an optimum motion path using a robot motion space even when the motion path search device is incapable of calculating a space swept through by the robot.

Furthermore, another possible embodiment of the present disclosure is a robot control device including a control unit which controls the robot 302 according to a motion path thus determined.

Furthermore, all or part of the constituent elements of the motion path search devices in the exemplary embodiments may be composed of a single system large scale integration (LSI). For example, a motion path search device may be configured as a system LSI including a motion space identification unit 102, a spatial difference calculation unit 104, a feedback unit 105, and a path search unit 106.

The system LSI is a super-multifunctional LSI in which constituent units are integrated on a single chip, and is specifically a computer system including a microprocessor, a read-only memory (ROM), and a random-access memory (RAM). The ROM stores a computer program. The microprocessor operates according to the computer program so that the system LSI can perform its function.

The integrated circuit described as a system LSI above may be referred to as an IC, an LSI, a super LSI or an ultra LSI depending on the degree of integration. The method of forming integrated circuitry is not limited to use of an LSI. Dedicated circuitry or a general-purpose processor may be used instead of an LSI. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. The application of biotechnology or the like is possible.

Furthermore, another possible embodiment of the present disclosure is a method of searching for a motion path including the characteristic processing units in the motion path search device as a stepwise process. Furthermore, another possible embodiment of the present disclosure is a computer program which causes a computer to execute the characteristic stepwise process of the method of searching for a motion path. Such a computer program can be distributed via a non-transitory computer-readable recording medium such as a compact disc read-only memory (CD-ROM) or a communication network such as the Internet.

In the exemplary embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. The motion path search devices in the above-described embodiments are implemented by executing a software program below.

That is, the program causes a computer to execute: identifying, as first spaces, three-dimensional spaces swept through by a movable part of a robot in a plurality of direct teaching operations performed by an operator to teach a motion to the robot by directly moving the robot; identifying, as second spaces, three-dimensional spaces swept through by at least a portion of a body of the operator in the direct teaching operations; calculating a first differential space and a second differential space, the first differential space being a part of one of the first spaces which is identified as a result of one of the direct teaching operations and having no overlap with an other of the first spaces which is identified as a result of an other of the direct teaching operations that precedes the one of the direct teaching operations, and the second differential space being a part of one of the second spaces which is identified as a result of the one of the direct teaching operations and having no overlap with an other of the second spaces which is identified as a result of the other of the direct teaching operations that precedes the one of the direct teaching operations; providing the operator with at least one of information regarding the first differential space and information regarding the second differential space; combining a first accessible space and a second accessible space, the first accessible space being a combination of the first spaces identified as results of the direct teaching operations, and the second accessible space being a combination of the second spaces identified as results of the direct teaching operations; and searching for a motion path of the movable part within a space resulting from the combining, after the direct teaching operations are completed.

One or more exemplary embodiments of the present disclosure are applicable to an application for a robot which autonomously searches for a motion path and operates after teaching.

The invention claimed is:

1. A motion path search device comprising:
   a first space identification unit, via a computer system, configured to identify, as first spaces, three-dimensional spaces passed through by a movable part of a robot in a plurality of direct teaching operations performed by an operator to teach a motion to the robot, the direct teaching operations being performed by directly moving the robot using a hand of the operator;
   a second space identification unit, via the computer system, configured to identify, as second spaces, three-dimensional spaces occupied by at least a portion of a body of the operator during the direct teaching operations using a three-dimensional position measuring device mounted on the portion of a body of the operator;
   a spatial difference calculation unit configured to calculate a first differential space and a second differential space, the first differential space being a part of one of the first spaces which is identified as a result of one of the direct teaching operations and having no overlap with another of the first spaces which is identified as a result of another the direct teaching operations that precedes the one of the direct teaching operations, and the second differential space being a part of one of the second spaces which is identified as a result of the one of the direct teaching operations and having no overlap with another of the second spaces which is identified as a result of the other of the direct teaching operations that precedes the one of the direct teaching operations;

a feedback unit configured to provide the operator with at least one of information regarding the first differential space and information regarding the second differential space;

a space combining unit, via the computer system, configured to combine a first accessible space and a second accessible space, the first accessible space being a combination of the first spaces identified as results of the direct teaching operations, and the second accessible space being a combination of the second spaces identified as results of the direct teaching operations; and a path search unit, via the computer system, configured to search for a motion path of the movable part within a space resulting from the combining by the space combining unit, after the direct teaching operations are completed.

2. The motion path search device according to claim 1, wherein the feedback unit is configured to provide, as the information regarding the first differential space, a volume ratio of the first differential space to the first space identified as the result of the other of the direct teaching operations that precedes the one of the direct teaching operations.

3. The motion path search device according to claim 2,
wherein the first space identification unit is configured to identify, as the first spaces, spaces each composed of a set of voxels included in the robot at points of time in a corresponding one of the direct teaching operations, the voxels being among voxels composing three-dimensional space, and the feedback unit is configured to provide, as the volume ratio, a ratio of the number of voxels composing the first differential space to the number of voxels composing the first space identified as the result of the other of the direct teaching operations that precedes the one of the direct teaching operations.

4. The motion path search device according to claim 1,
wherein the feedback unit is configured to provide, as the information regarding the second differential space, a volume ratio of the second differential space to the second space identified as the result of the other of the direct teaching operations that precedes the one of the direct teaching operations.

5. The motion path search device according to claim 4,
wherein the second space identification unit is configured to identify, as the second spaces, spaces each composed of a set of voxels included in the at least a portion of the body of the operator at points of time in a corresponding one of the direct teaching operations, the voxels being among voxels composing three-dimensional space, and the feedback unit is configured to provide, as the volume ratio, a ratio of the number of voxels composing the second differential space to the number of voxels composing the second space identified as the result of the other of the direct teaching operations that precedes the one of the direct teaching operations.

6. The motion path search device according to claim 1,
wherein the feedback unit is configured to provide one of the information regarding the first differential space and the information regarding the second differential space, depending on a result of comparison between the first differential space and the second differential space.

7. The motion path search device according to claim 6,
wherein the feedback unit is configured to provide the information regarding the first differential space when the first differential space is smaller than the second differential space, and with the information regarding the second differential space when the second differential space is smaller than the first differential space.

8. The motion path search device according to claim 1, further comprising
a posture difference calculation unit configured to calculate a difference between one or more values indicating a posture of the operator at a start of an other of the direct teaching operations which immediately precedes the one of the direct teaching operations and one or more values indicating a posture of the operator at a start of the one of the direct teaching operations, wherein the feedback unit is further configured to provide the operator with information regarding the posture, based on the calculated difference, at the start of the one of the direct teaching operations.

9. The motion path search device according to claim 8,
wherein the robot has a handle part which the operator grasps to perform the direct teaching operations, and the postures of the operator are directions of an elbow of the operator as seen from the handle part.

10. The motion path search device according to claim 9,
wherein the values indicating the postures include first values and second values, the first values each indicating an angle of a corresponding one of the direction of the elbow with respect to a plane perpendicular to an axis of the handle part, and the second values each indicating an angle between the corresponding one of the directions of the elbow and the plane, the posture difference calculation unit is configured to calculate a difference between the first values and a difference between the second values, and the feedback unit is configured to provide the information regarding the posture, based on a result of comparison between the difference between the first values and the difference between the second values.

11. The motion path search device according to claim 8,
wherein the feedback unit is configured to provide the information regarding the posture at the start of the one of the direct teaching operations when the second differential space is smaller than the first differential space as a result of the other of the direct teaching operations which immediately precedes the one of the direct teaching operations.

* * * * *